(12) United States Patent
Sekimori

(10) Patent No.: US 11,835,138 B2
(45) Date of Patent: Dec. 5, 2023

(54) DIAPHRAGM SEAL AND MAINTENANCE METHOD THEREOF

(71) Applicant: YOKOGAWA ELECTRIC CORPORATION, Tokyo (JP)

(72) Inventor: Yukimitsu Sekimori, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 239 days.

(21) Appl. No.: 17/491,911

(22) Filed: Oct. 1, 2021

(65) Prior Publication Data

US 2022/0112954 A1  Apr. 14, 2022

(30) Foreign Application Priority Data

Oct. 8, 2020 (JP) .................... 2020-170763

(51) Int. Cl.
*F16J 15/32* (2016.01)
*F16J 15/3284* (2016.01)
*G01L 19/00* (2006.01)
*G01L 19/06* (2006.01)

(52) U.S. Cl.
CPC ....... *F16J 15/3284* (2013.01); *G01L 19/0046* (2013.01); *G01L 19/0645* (2013.01)

(58) Field of Classification Search
CPC ...... F16J 15/3284; F16J 3/02; G01L 19/0046; G01L 19/0645
See application file for complete search history.

(56) References Cited

U.S. PATENT DOCUMENTS 5,400,655 A * 3/1995 Tamai ................. G01L 19/0627
73/706
9,057,659 B2 * 6/2015 Hedtke ............... G01L 19/0645

FOREIGN PATENT DOCUMENTS

| JP | 2002-022586 A | 1/2002 | |
|---|---|---|---|
| JP | 2002071494 A * | 3/2002 | |
| JP | 2014-089171 A | 5/2014 | |
| WO | WO-2019222598 A1 * | 11/2019 | ........... B23K 11/093 |

* cited by examiner

*Primary Examiner* — Francis C Gray
(74) *Attorney, Agent, or Firm* — Osha Bergman Watanabe & Burton LLP

(57) ABSTRACT

A diaphragm seal includes a first diaphragm that faces a measurement medium, a sealed-liquid housing, and a second diaphragm. The first diaphragm receives pressure from the measurement medium. The sealed-liquid housing houses a sealed liquid for transferring the pressure to a transmitter. The second diaphragm causes hydrogen intruded into the sealed liquid to permeate through the second diaphragm and be discharged from the sealed liquid.

10 Claims, 14 Drawing Sheets

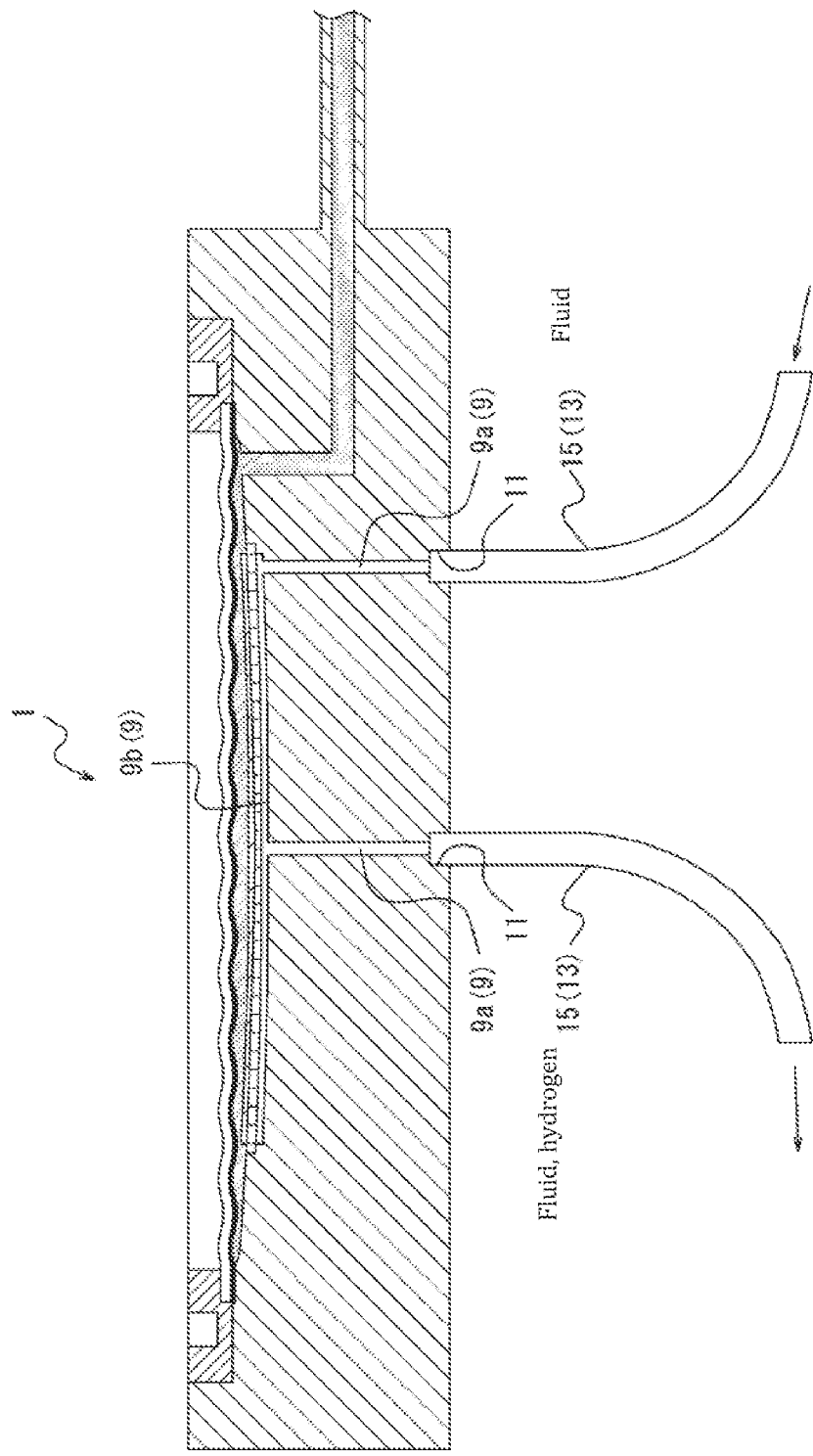

DIAPHRAGM SEAL AND MAINTENANCE METHOD THEREOF

BACKGROUND

Technical Field

The present disclosure relates to a diaphragm seal and a maintenance method thereof.

Related Art

A diaphragm seal is known that has a diaphragm, disposed facing a measurement medium, and a sealed-liquid housing portion that houses a sealed liquid for transferring a pressure that the diaphragm receives from the measurement medium to a transmitter (for example, see patent literatures 1 and 2). Based on the pressure of the measurement medium transferred to the transmitter by the diaphragm seal, a physical quantity of the measurement medium can be measured.

PATENT LITERATURE

Patent Literature 1: JP 2002-22586 A
Patent Literature 2: JP 2014-89171 A

When hydrogen that has permeated the diaphragm from the measurement medium and intruded into the sealed liquid exceeds a dissolution tolerance thereof in the sealed liquid, hydrogen bubbles form in the sealed liquid, and the diaphragm seal produces a measurement error. However, the conventional diaphragm seal cannot efficiently discharge from the sealed liquid the hydrogen that has intruded into the sealed liquid.

SUMMARY

One or more embodiments provide a diaphragm seal that can efficiently discharge, from a sealed liquid, hydrogen that has intruded into the sealed liquid and to provide a maintenance method of this diaphragm seal.

A diaphragm according to one or more embodiments has: a first diaphragm that faces a measurement medium; a sealed-liquid housing portion that houses a sealed liquid for transferring pressure that the first diaphragm receives from the measurement medium to a transmitter; and a second diaphragm that, in order to discharge hydrogen intruded into the sealed liquid from the sealed liquid, causes the hydrogen to permeate therethrough. Such a configuration enables the hydrogen intruded into the sealed liquid to be efficiently discharged from the sealed liquid by causing the hydrogen to permeate the second diaphragm.

In one or more embodiments, a diaphragm seal includes a hydrogen discharge path for discharging the hydrogen permeated through the second diaphragm to outside the diaphragm seal. Such a configuration enables the hydrogen permeated through the second diaphragm to be discharged to outside the diaphragm seal through the hydrogen discharge path.

In one or more embodiments, the hydrogen discharge path has an external component connection portion that can connect an external component. Such a configuration enables the external component, which is constituted by piping, a sealing plug, a hydrogen occlusion cartridge, a sensor, or the like, to be easily installed.

In one or more embodiments, the external component has a hydrogen occlusion cartridge. Such a configuration enables advantageous adaptation to a usage environment that cannot tolerate discharging of hydrogen.

In one or more embodiments, a diaphragm seal includes a pressure-resistant structure in a state wherein the external component is connected to the external component connection portion. Such a configuration enables adaptation to a usage environment wherein a pressure-resistant structure is necessary.

In one or more embodiments, the external component connection portion is sealed by the external component with the hydrogen discharge path in a negative-pressure state. Such a configuration enables an increased hydrogen discharge rate from the sealed liquid.

In one or more embodiments, the second diaphragm has a substrate and a material that is disposed on a surface on a sealed-liquid side of the substrate and functions as a catalyst that prompts hydrogen dissociation in order to accelerate intrusion of the hydrogen into the second diaphragm. Such a configuration enables an increased hydrogen discharge rate from the sealed liquid.

In one or more embodiments, the second diaphragm has a substrate and a material that is disposed on a surface on a sealed-liquid side of the substrate and more readily absorbs the hydrogen than the substrate in order to accelerate intrusion of the hydrogen into the second diaphragm. Such a configuration enables an increased hydrogen discharge rate from the sealed liquid.

In one or more embodiments, the material includes a platinum-group metal or an alloy thereof, or a compound thereof. Such a configuration enables a more reliably increased hydrogen discharge rate from the sealed liquid.

In one or more embodiments, the material has a thin-film structure thinner than a thickness of the substrate. Such a configuration can decrease a usage quantity of expensive precious metals and reduce costs.

In one or more embodiments, the material is constituted as a plurality of layers. Such a configuration can increase a degree of freedom in material selection.

In one or more embodiments, the substrate is formed of SUS316L. Such a configuration can suppress hydrogen embrittlement of the second diaphragm.

In one or more embodiments, the substrate is formed of a conductive ceramic material wherethrough the hydrogen permeates. Such a configuration enables an increased hydrogen discharge rate from the sealed liquid.

In one or more embodiments, the substrate has a porous structure provided with holes that allow the hydrogen to permeate but do not allow the sealed liquid to permeate. Such a configuration enables an increased hydrogen discharge rate from the sealed liquid.

In one or more embodiments, a hydrogen permeation rate of the second diaphragm is greater than a hydrogen permeation rate of the first diaphragm. Such a configuration can more reliably suppress hydrogen bubbles forming in the sealed liquid.

In one or more embodiments, a diaphragm seal includes: a supporting face that contacts a surface on an opposite side of the sealed liquid of the second diaphragm by the second diaphragm being deformed to the opposite side of the sealed liquid by the pressure of the measurement medium and thereby supports the second diaphragm. Such a configuration enables a thin second diaphragm to be provided, which can increase a hydrogen discharge rate from the sealed liquid.

In one or more embodiments, the supporting face has a hydrogen discharge groove that constitutes the hydrogen discharge path. In such a configuration, the hydrogen discharge groove can increase a hydrogen discharge rate from the sealed liquid.

In one or more embodiments, the hydrogen discharge path has the hydrogen discharge groove and a hydrogen discharge hole that is communicated to the hydrogen discharge groove. Such a configuration enables efficient hydrogen discharging using the hydrogen discharge path.

In one or more embodiments, the hydrogen discharge hole has the external component connection portion. Such a configuration enables the external component connection portion to be provided in a simple structure.

In one or more embodiments, the second diaphragm has an opening, and the sealed-liquid housing portion is communicated to a capillary through the opening. Such a configuration can provide a structure that forms the second diaphragm all the way to an outer peripheral portion of the first diaphragm, where the hydrogen easily accumulates, and that can more reliably discharge the hydrogen from the sealed liquid.

In one or more embodiments, a diaphragm seal includes a sensor that acquires physical information regarding an interior of the diaphragm seal. Alternatively, the external component is the sensor that acquires the physical information regarding the interior of the diaphragm seal. Such a configuration enables effective maintenance of the diaphragm seal based on the physical information regarding the interior of the diaphragm seal acquired by the sensor.

A method of maintaining a diaphragm seal according to one or more embodiments—the diaphragm seal having a first diaphragm that faces a measurement medium, a sealed-liquid housing portion that houses a sealed liquid for transferring pressure that the first diaphragm receives from the measurement medium to a transmitter, and a second diaphragm that, in order to discharge hydrogen intruded into the sealed liquid from the sealed liquid, causes the hydrogen to permeate therethrough—has: a discharging step of discharging the hydrogen permeated through the second diaphragm to outside the diaphragm seal. Such a configuration enables efficient discharging of the hydrogen that has intruded into the sealed liquid from the sealed liquid by carrying out the discharging step at an appropriate timing.

In one or more embodiments, a method of maintaining a diaphragm seal includes: a determination step of using a sensor installed to the diaphragm seal to acquire physical information relating to a hydrogen occlusion quantity of a hydrogen occlusion cartridge installed to the diaphragm seal to occlude the hydrogen permeated through the second diaphragm and of determining whether to exchange the hydrogen occlusion cartridge. Such a configuration enables appropriate exchanging of the hydrogen occlusion cartridge.

In one or more embodiments, the discharging step has a heating step of heating the diaphragm seal, thereby increasing a hydrogen permeation rate of the second diaphragm, and thus accelerating discharging of the hydrogen to outside the diaphragm seal. Such a configuration enables the discharging step to be performed efficiently.

In one or more embodiments, the diaphragm seal has a hydrogen discharge path for discharging the hydrogen permeated through the second diaphragm to outside the diaphragm seal, the hydrogen discharge path has a first opening and a second opening that open to outside the diaphragm seal, and the discharging step has a fluid introduction step of introducing a fluid through one among the first opening and the second opening and discharging the hydrogen together with the fluid through the other among the first opening and the second opening. Such a configuration enables the discharging step to be performed efficiently.

One or more embodiments provide a diaphragm seal that can efficiently discharge, from a sealed liquid, hydrogen that has intruded into the sealed liquid and can provide a maintenance method of this diaphragm seal.

BRIEF DESCRIPTION OF THE DRAWINGS

FIG. 14 is a sectional view illustrating the diaphragm seal of a seventh embodiment.

DETAILED DESCRIPTION

Embodiments of the present disclosure are illustrated and described in detail below with reference to the drawings.

Comparative Examples

First, before describing one or more embodiments, diaphragm seals as comparative examples are described.

Figure 1:
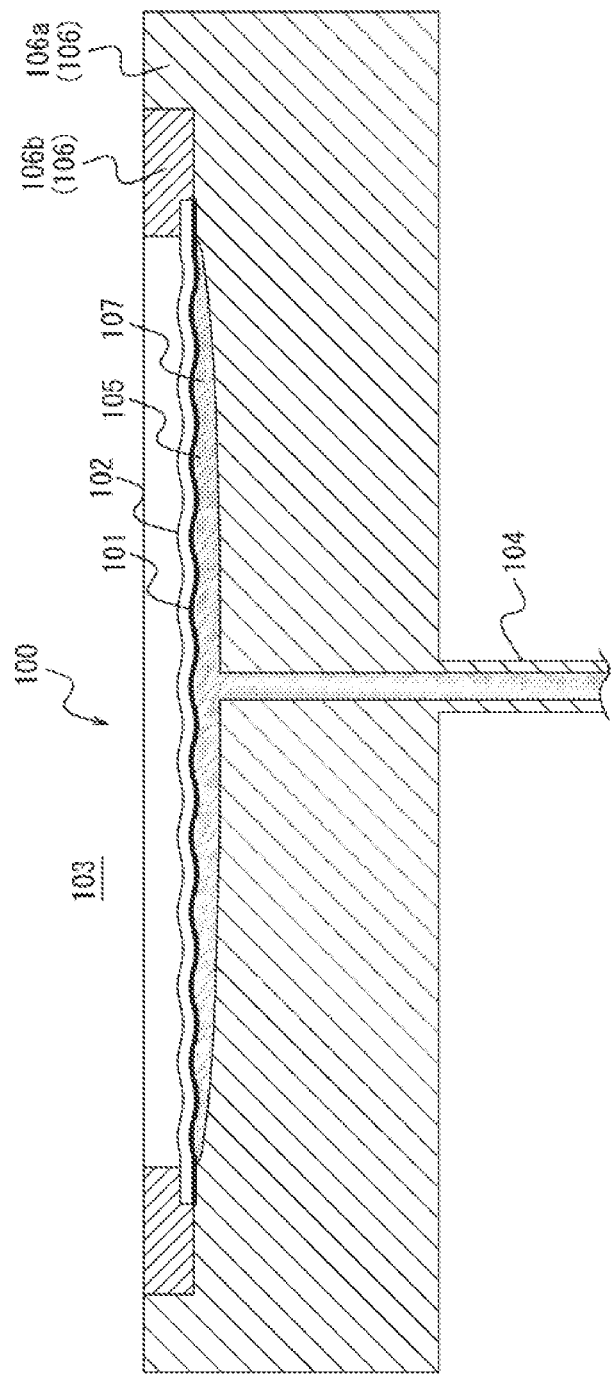
FIG. 1 is a sectional view illustrating a diaphragm seal of a first comparative example.

A diaphragm seal 100 of a first comparative example illustrated in FIG. 1 has a general structure, wherein a coating film 101 (a gold film or the like) for hydrogen permeation prevention is applied on a diaphragm 102. The diaphragm seal 100 is used when it would be problematic for a fluid to be measured that is a process fluid in a separate location—that is, a measurement medium 103—to directly intrude into a pressure receiving portion (transmitter) of a pressure gauge or differential pressure gauge when measuring a pressure of the measurement medium 103. Moreover, it is also used when, for example, measuring a measurement medium 103 having a higher temperature than a product specification temperature of the transmitter.

The diaphragm seal 100 and the transmitter are connected by a capillary 104 wherein a sealed liquid 105 such as an oil is sealed. The diaphragm seal 100 is constituted by the diaphragm 102, which receives the pressure of the measurement medium 103, and a block 106. The block 106 is constituted by a block main body 106a and a seal ring 106b.

The diaphragm 102 is joined to the seal ring 106b by welding, and the seal ring 106b is joined to the block main body 106a by welding. The diaphragm seal 100 has a sealed-liquid housing portion 107 (sealed-liquid housing) that houses the sealed liquid 105. The sealed-liquid housing portion 107 is formed by the diaphragm 102 and the block main body 106a.

When using a differential pressure transmitter as the transmitter, pressures of the measurement medium 103 are respectively received by two diaphragm seals 100 installed on both a high-pressure side and a low-pressure side. These are transferred to the differential pressure transmitter via the sealed liquid 105, the transferred pressure difference is detected by a sensor provided in the differential pressure transmitter, and a differential pressure signal is transmitted.

A hydrogen permeation mechanism into the sealed liquid 105 is as follows: Hydrogen molecules adsorb onto a surface of the diaphragm 102. The hydrogen molecules dissociate into hydrogen atoms, and these dissolve into the diaphragm 102. The dissolved hydrogen is diffused in the diaphragm 102 and returns to its molecular form at a surface on an opposite side of the above surface of the diaphragm 102, and the hydrogen molecules are released into the sealed liquid 105. When a dissolution tolerance of hydrogen in the sealed liquid 105 is exceeded, hydrogen bubbles form therein. Hydrogen bubbles forming therein prohibits the transfer of pressure from the diaphragm seal 100 to the transmitter, producing a measurement error and disabling use of the transmitter.

[Art of Hydrogen Permeation Prevention Measures (Permeation Prevention Coating)]

As above, the first comparative example uses a structure wherein the coating film 101 is applied on the diaphragm 102. The coating film 101 is often applied on an inner-face side of the diaphragm 102 but may be applied on an outer-face side of the diaphragm 102 or on both faces. As a material of the coating film 101, a material having low hydrogen permeability is used; gold is often used, but a ceramic or other material may also be used. By applying the coating film 101, hydrogen permeating the diaphragm 102 and intruding into the sealed liquid 105 is suppressed.

[Art of Hydrogen Permeation Prevention Measures (Art of Measures Using Two Diaphragms)]

Figure 2:
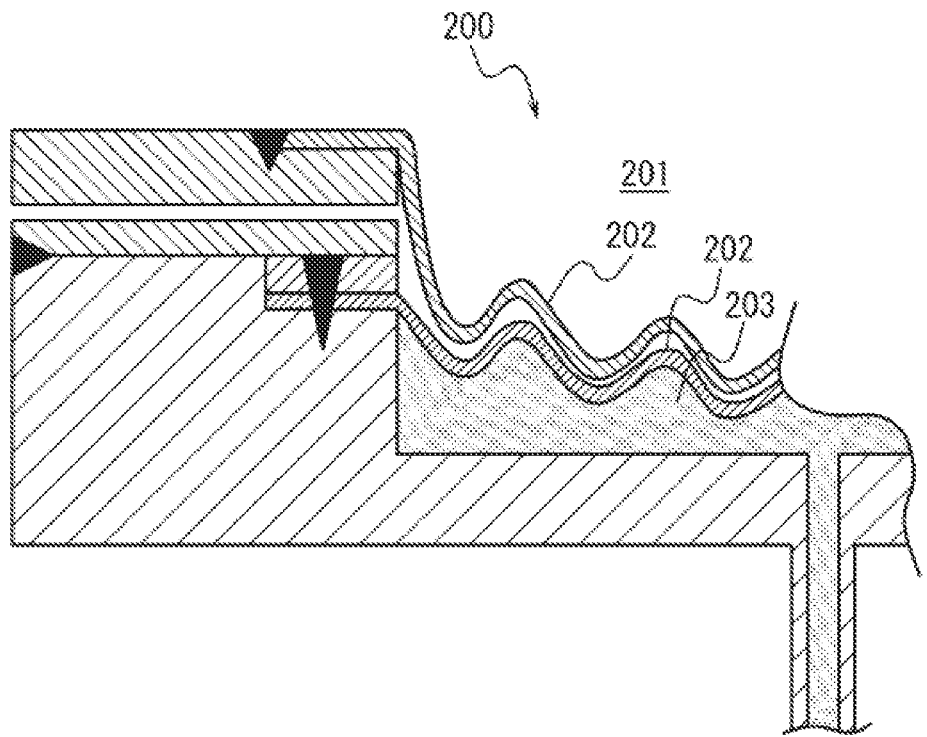
FIG. 2 is a sectional view illustrating a diaphragm seal of a second comparative example.

As in a second comparative example illustrated in FIG. 2, a structure may be provided for releasing hydrogen, permeated through a diaphragm 202 contacting a measurement medium 201, to outside a diaphragm seal 200. By using two diaphragms 202 and providing a gap between the two diaphragms 202, the hydrogen may be released to outside the diaphragm seal 200 before the hydrogen is diffused in the diaphragms 202 sealing a sealed liquid 203. This structure can suppress hydrogen intrusion into the sealed liquid 203.

[Hydrogen Occlusion Art]

Figure 3:
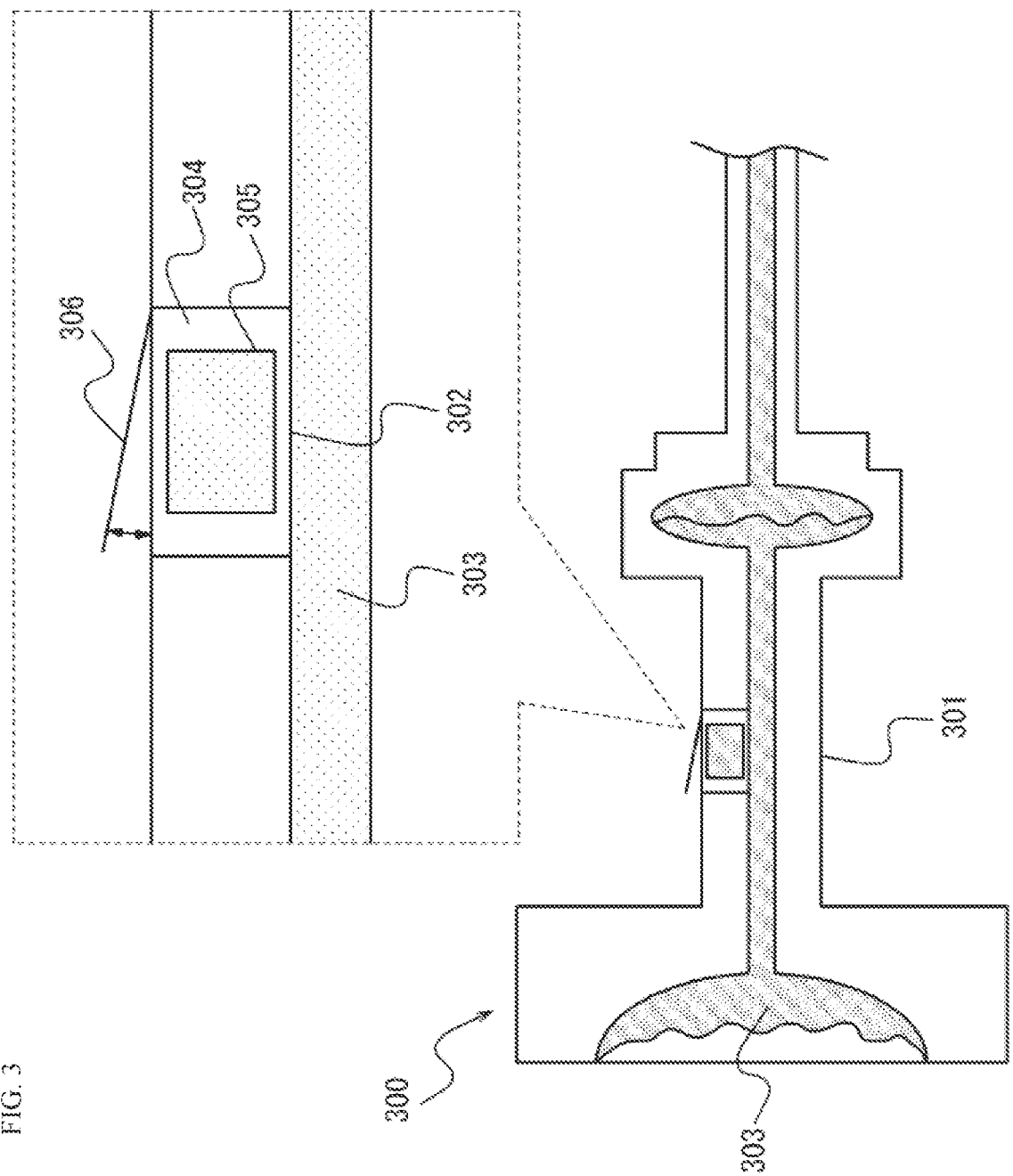
FIG. 3 is a sectional view illustrating a diaphragm seal of a third comparative example.

There is a method of taking measures of causing hydrogen that has permeated a diaphragm and intruded into a sealed liquid to be absorbed into a metal, thereby decreasing a hydrogen quantity in the sealed liquid. Although a considerable quantity of hydrogen is also absorbed and occluded in a metal material such as stainless steel (SUS) that is used for components such as a block and a capillary, the method is used to further increase the hydrogen quantity absorbed and stored by a diaphragm seal, the capillary, and the like. The structure disposes a metal thin film or a metal powder having a greater hydrogen absorption quantity per unit volume than the metal material such as SUS. As the metal material used for hydrogen occlusion, palladium (Pd), a Pd alloy, or the like is used, which occludes a particularly large quantity of hydrogen. A time until hydrogen bubbles form in the sealed liquid can be delayed by an amount corresponding to a quantity of the hydrogen that has permeated the diaphragm and intruded into the sealed liquid that is occluded in the metal. A diaphragm seal 300 of a third comparative example illustrated in FIG. 3 has a structure that provides a hydrogen-permeable material 302 in a capillary 301 and causes hydrogen in a sealed liquid 303 that has permeated the hydrogen-permeable material 302 to be occluded by a hydrogen-occluding material 305 disposed in an occlusion chamber 304. Upon occluding the hydrogen, the hydrogen-occluding material 305 can be taken out from an openable lid 306 provided above the occlusion chamber 304.

A structure that coats gold or another material having low hydrogen permeability, as in the first comparative example, and a structure that prevents hydrogen from permeating inside, as in the second comparative example, are methods for decreasing a hydrogen permeation quantity. However, it is difficult for these methods to completely suppress hydrogen permeation. As such, in strict process conditions wherein hydrogen permeation occurs readily, these are but measures for extending a life of a transmitter.

A method that provides measures against hydrogen permeation by causing hydrogen that has permeated a diaphragm and intruded into a sealed liquid to be occluded in a metal, as in the third comparative example, can provide a countermeasure effect up to a hydrogen quantity that can be occluded in the metal. However, the effect is no longer obtained when the occlusion tolerance is exceeded.

Furthermore, the diaphragm seal is disposed so as to contact a measurement medium, and in many cases, it is used by being exposed to a high process temperature. A hydrogen quantity that permeates the diaphragm and other materials is according to Fick's law (see formula (1) below); it can be seen that the permeation quantity increases when the diffusion coefficient increases proportionally to temperature. Meanwhile, the hydrogen occlusion quantity of the hydrogen-occluding material is inversely proportional to temperature, and a hydrogen dissolution quantity in the metal decreases as the temperature increases. As such, because hydrogen occlusion becomes unable to be performed depending on temperature conditions, uses that provide a hydrogen occlusion effect are limited.

The diaphragm seal directly receives a process temperature. However, the capillary is separated from the diaphragm seal and thus has a lower temperature than the process temperature. As such, there is a method that attempts to obtain a hydrogen occlusion effect by disposing the metal for hydrogen occlusion in the capillary, which is less likely to reach a high temperature. However, when the hydrogen-occluding material is disposed in a location separated from the diaphragm, which is the intrusion path of the hydrogen, hydrogen bubbles may form near the diaphragm, before the hydrogen is occluded. As a result, a sufficient effect may not be obtained.

Therefore, methods of occluding occludable hydrogen in metal are limited by usable process conditions and uses and also have a limited occlusion quantity. As such, they cannot serve as fundamental measures against the phenomenon of hydrogen permeation. That is, they are but measures for extending a life of a transmitter.

[Fick's Law]

[Math. 1]

$$Q = D \times A \times \frac{C_1 - C_2}{d} \times t \quad \text{formula (1)}$$

Q: diffused hydrogen quantity
D: diffusion coefficient
A: area
C: hydrogen partial pressure
d: distance
t: time

[Hydrogen Removal in Sealed Liquid]

When, as in the first comparative example, a structure is formed that coats a material having low hydrogen permeability on a diaphragm, hydrogen can be suppressed from permeating inside. However, this structure also makes it difficult to remove a diaphragm seal from process piping and the like and to discharge hydrogen to the outside by going back up a path whereby the hydrogen intruded into the structure. As such, it is difficult to regenerate hydrogen by discharging hydrogen from a diaphragm seal that takes measures to suppress permeation through a diaphragm.

A structure may, as in the third comparative example, provide a hydrogen-permeable material on a wall face of a capillary and dispose a hydrogen occlusion chamber so as to cover this hydrogen-permeable material. A hydrogen-occluding material is disposed in this hydrogen occlusion chamber, and upon absorbing hydrogen, the hydrogen-occluding material can be exchanged by opening and closing a lid. However, due to the following reasons, it is difficult to obtain the anticipated effects from this structure. Pressure is applied on a pressure transfer path to a transmitter. For hydrogen to permeate from the hydrogen-permeable material to the hydrogen occlusion chamber, a structure wherefrom a sealed liquid does not leak is necessary—the hydrogen-permeable material must have a structure that can withstand the pressure. As such, not only easy hydrogen permeation but also a high pressure resistance performance is demanded of the hydrogen-permeable material. When it is attempted to improve the pressure resistance performance by increasing a thickness of the hydrogen-permeable material, a hydrogen permeation performance decreases significantly in an inversely proportional manner to the film thickness. There is a trade-off relationship between a hydrogen permeation rate and the pressure resistance performance and the like that the hydrogen-permeable material needs. Moreover, because the hydrogen-permeable material readily undergoes hydrogen embrittlement, a configuration that uses only the hydrogen-permeable material experiences brittle fracture.

The third comparative example has a structure that disposes the hydrogen-permeable material and the hydrogen-occluding material in the same location. The quantity of hydrogen that permeates the hydrogen-permeable material increases proportionally to temperature, and hydrogen occlusion decreases in an inversely proportional manner to temperature. As such, when this structure is formed in the diaphragm seal or nearby in high-temperature conditions, hydrogen permeation into the hydrogen occlusion chamber becomes favorable, but the hydrogen-occluding material becomes unable to occlude the hydrogen. As such, this must be provided on a wall face of the capillary separated from the diaphragm seal so the temperature conditions enable hydrogen occlusion. In addition to damaging structural portions, usage conditions may be limited.

One or more embodiments described below prevent a life of a measuring instrument from being determined due to hydrogen bubbles, formed by hydrogen that has permeated a diaphragm and intruded into a diaphragm seal, blocking transfer of pressure from the diaphragm seal to a transmitter.

According to one or more embodiments, it is possible to ensure a pressure resistance performance of the diaphragm seal that is necessary for the measuring instrument and to simultaneously prevent usage conditions from becoming limited due to usage temperature conditions and the like.

According to one or more embodiments, it is possible to easily discharge, by performing maintenance, the hydrogen that has intruded into the diaphragm seal or to continuously discharge such at a time of use.

One or more embodiments are illustrated and described with reference to FIG. 4 to FIG. 14. Note that corresponding elements in each diagram are labeled with the same reference signs.

First Embodiment

Figure 4:
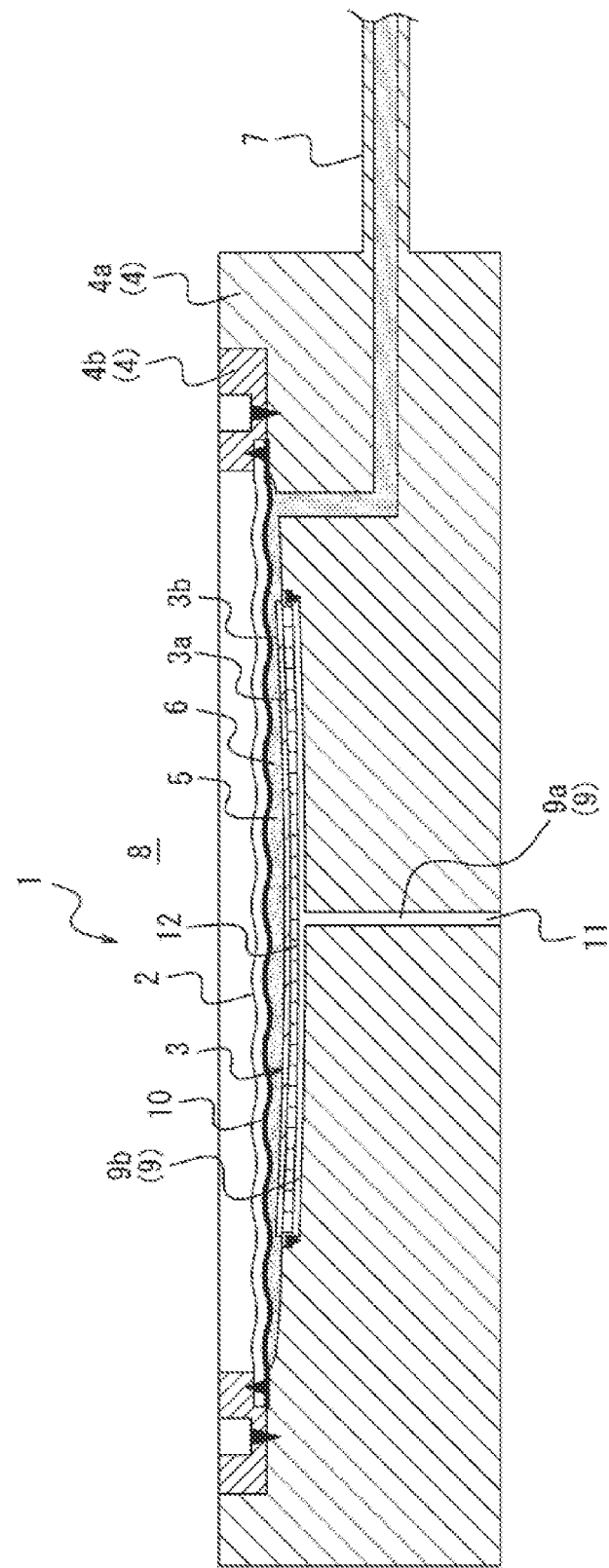
FIG. 4 is a sectional view illustrating a diaphragm seal of a first embodiment.

A diaphragm seal 1 according to a first embodiment illustrated in FIG. 4 has a first diaphragm 2, a second diaphragm 3, and a block 4. The block 4 is constituted by a block main body 4a and a seal ring 4b. The first diaphragm 2 is joined to the seal ring 4b by welding, and the seal ring 4b is joined to the block main body 4a by welding. The diaphragm seal 1 has a sealed-liquid housing portion 6 that houses a sealed liquid 5 such as an oil. The sealed-liquid housing portion 6 is formed by the first diaphragm 2, the second diaphragm 3, and the block 4. The diaphragm seal 1 and a transmitter are joined by a capillary 7, and a pressure of a measurement medium 8 is transferred to the transmitter via the sealed liquid 5 sealed therein.

In this manner, the diaphragm seal 1 has the first diaphragm 2 that faces the measurement medium 8; the sealed-liquid housing portion 6, which houses the sealed liquid 5 for transferring the pressure that the first diaphragm 2 receives from the measurement medium 8 to the transmitter; and the second diaphragm 3, through which hydrogen is permeated in order to discharge hydrogen intruded into the sealed liquid 5 from the sealed liquid 5. The second diaphragm 3 is disposed opposing the first diaphragm 2.

Furthermore, the diaphragm seal 1 has a hydrogen discharge path 9 for discharging the hydrogen permeated through the second diaphragm 3 to outside the diaphragm seal 1. The hydrogen intrudes into the diaphragm seal 1 by being diffused in the first diaphragm 2 that faces the measurement medium 8 and is dissolved in the sealed liquid 5. The dissolved hydrogen is diffused in and passes through the second diaphragm 3 and is discharged from the sealed liquid 5. The hydrogen discharged from the sealed liquid 5 is discharged to outside the diaphragm seal 1 through the hydrogen discharge path 9.

A material of the first diaphragm 2 is changed according to the measurement medium 8, but a material such as SUS is used. To suppress hydrogen intruding into the diaphragm seal 1 from a measurement-medium 8 side, a coating film 10 for hydrogen permeation prevention, of gold or the like, is provided on an inner face of the first diaphragm 2. The second diaphragm 3 is constituted by films that are a substrate 3a made of SUS and a hydrogen-adsorbing material 3b made of Pd. An outer peripheral portion of the substrate 3a is welded to the block main body 4a, which is made of SUS, and a space wherein the sealed liquid 5 is sealed—that is, the sealed-liquid housing portion 6 and the hydrogen discharge path 9—is divided by the second diaphragm 3.

A hydrogen discharge hole 9a that provides a connection from inside the diaphragm seal 1 to the outside (atmosphere) is formed in the block main body 4a. A hydrogen discharge groove 9b is also formed in the block main body 4a so as to be communicated to the hydrogen discharge hole 9a. The hydrogen discharge path 9 is constituted by the hydrogen discharge groove 9b and the hydrogen discharge hole 9a. An external component connection portion 11 (connector) whereto an external component can be connected is provided near an outlet of the hydrogen discharge hole 9a. The external component connection portion 11 is constituted by a screw that is cut so an external component can be easily installed therein.

The pressure of the measurement medium 8 acts on the second diaphragm 3 via the first diaphragm 2 and the sealed liquid 5. Because a pressure difference relative to outside the diaphragm seal 1 (the atmosphere) arises across the second diaphragm 3, a structure of the second diaphragm 3 is imparted with a pressure resistance performance so this pressure difference does not cause damage. The second diaphragm 3 is disposed closely opposing the block 4 and is structured so even if pressure is applied to the second diaphragm 3, contact is made with the block 4 such that this pressure is transferred to a block 4 side. That is, the diaphragm seal 1 has a supporting face 12 that contacts a surface on an opposite side of the sealed liquid 5 of the second diaphragm 3 by the second diaphragm 3 being deformed to the opposite side of the sealed liquid 5 due to the pressure of the measurement medium 8 and thereby supports the second diaphragm 3. As such, a thickness of the second diaphragm 3 is able to be designed to be thin. By using an SUS material, which is less likely to undergo hydrogen embrittlement, as a material of the substrate 3a, a diaphragm-seal structure can be provided having a reliable pressure resistance structure.

When the second diaphragm 3 receives pressure from a sealed-liquid 5 side, a force applied due to the second diaphragm 3 and the supporting face 12 making contact is transferred to the block 4 side. However, it is often the case that this state is entered into at a time of use. When the second diaphragm 3 and the block 4 are in complete contact, with no gap, the hydrogen that has permeated the second diaphragm 3 becomes retained, and a situation arises wherein it is difficult to discharge the hydrogen to outside the diaphragm seal 1. As such, the hydrogen discharge groove 9b, which is for promoting hydrogen discharge, is formed in the supporting face 12 so a gap is formed between the second diaphragm 3 and the block 4. A plurality of hydrogen discharge grooves 9b is formed so as to be connected to the hydrogen discharge hole 9a, thereby promoting hydrogen discharge.

[Hydrogen Discharge in Diaphragm Seal 1]

The phenomenon relating to hydrogen permeation in the structure of the present case is as follows.

The hydrogen that intrudes into the diaphragm seal 1 permeates the first diaphragm 2 from the measurement medium 8 and is dissolved in the sealed liquid 5. The hydrogen that is dissolved in the sealed liquid 5 adsorbs to a surface of the hydrogen-adsorbing material 3b prior to hydrogen bubbles forming in the sealed liquid 5. The hydrogen is incorporated into the hydrogen-adsorbing material 3b and is diffused in the second diaphragm 3. The hydrogen is diffused through the second diaphragm 3, reaches an opposite-face side, and is released from the second diaphragm 3. The released hydrogen passes through the hydrogen discharge path 9 and is discharged to outside the diaphragm seal 1.

Figure 5:
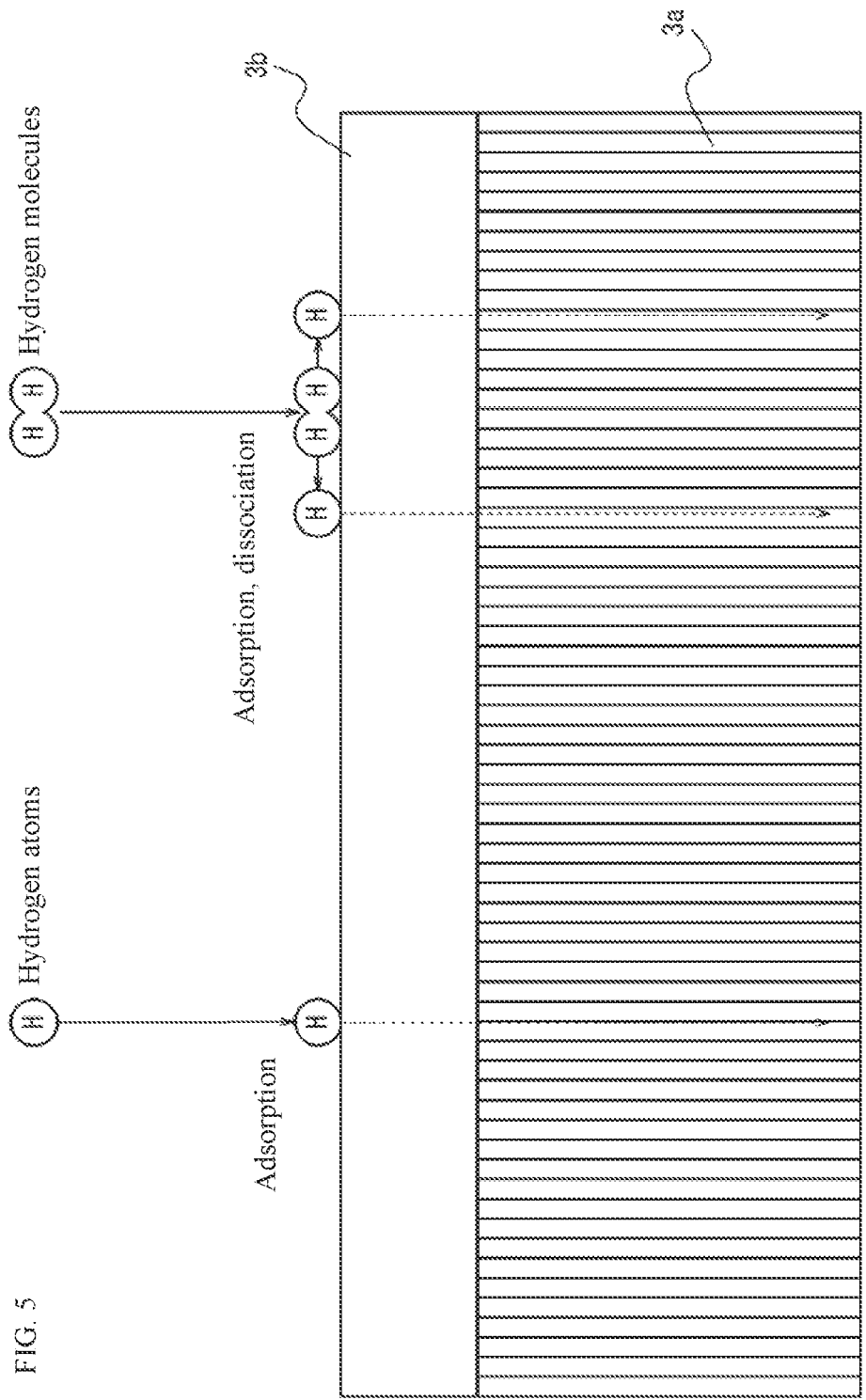
FIG. 5 is an explanatory diagram for describing a hydrogen permeation phenomenon in a second diaphragm.
Figure 6:
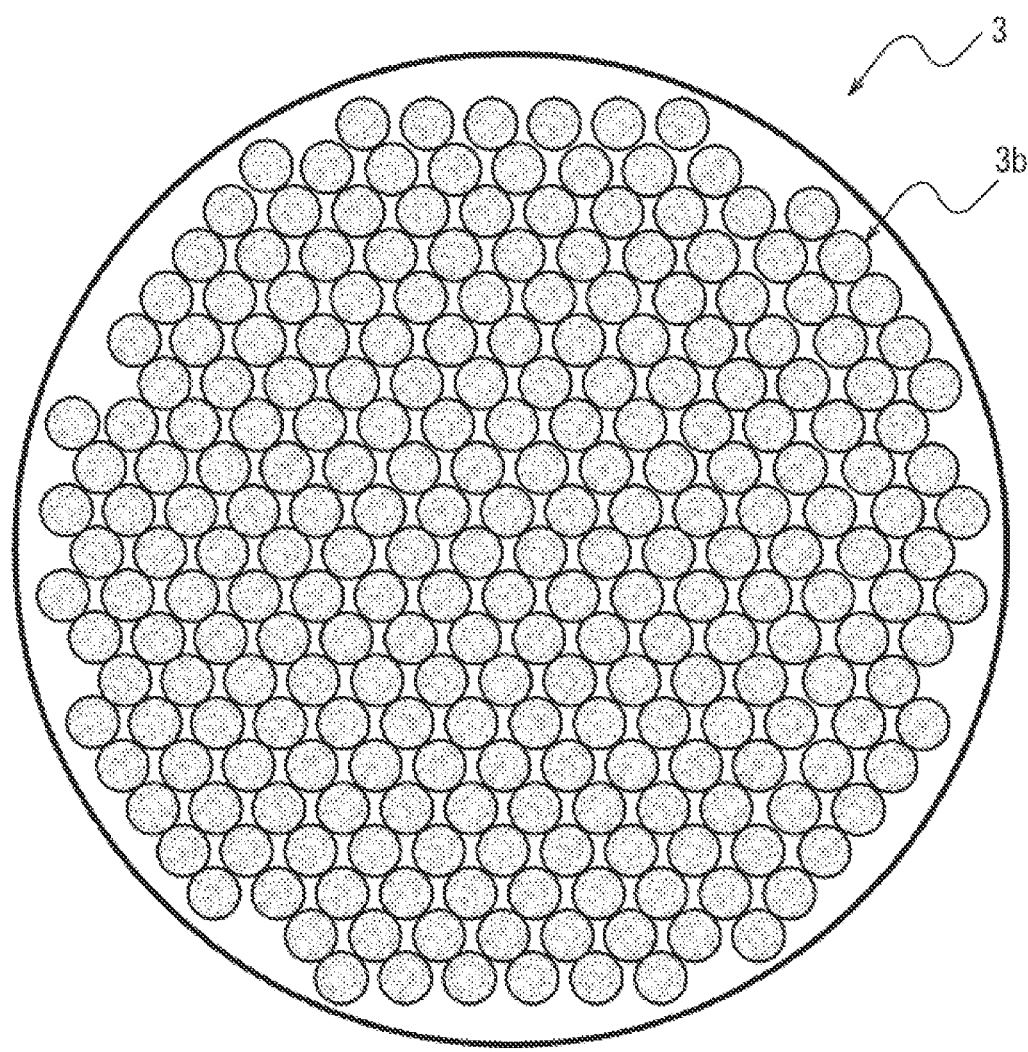
FIG. 6 is a plan view illustrating a variation of a hydrogen-adsorbing material of the second diaphragm.
Figure 7:
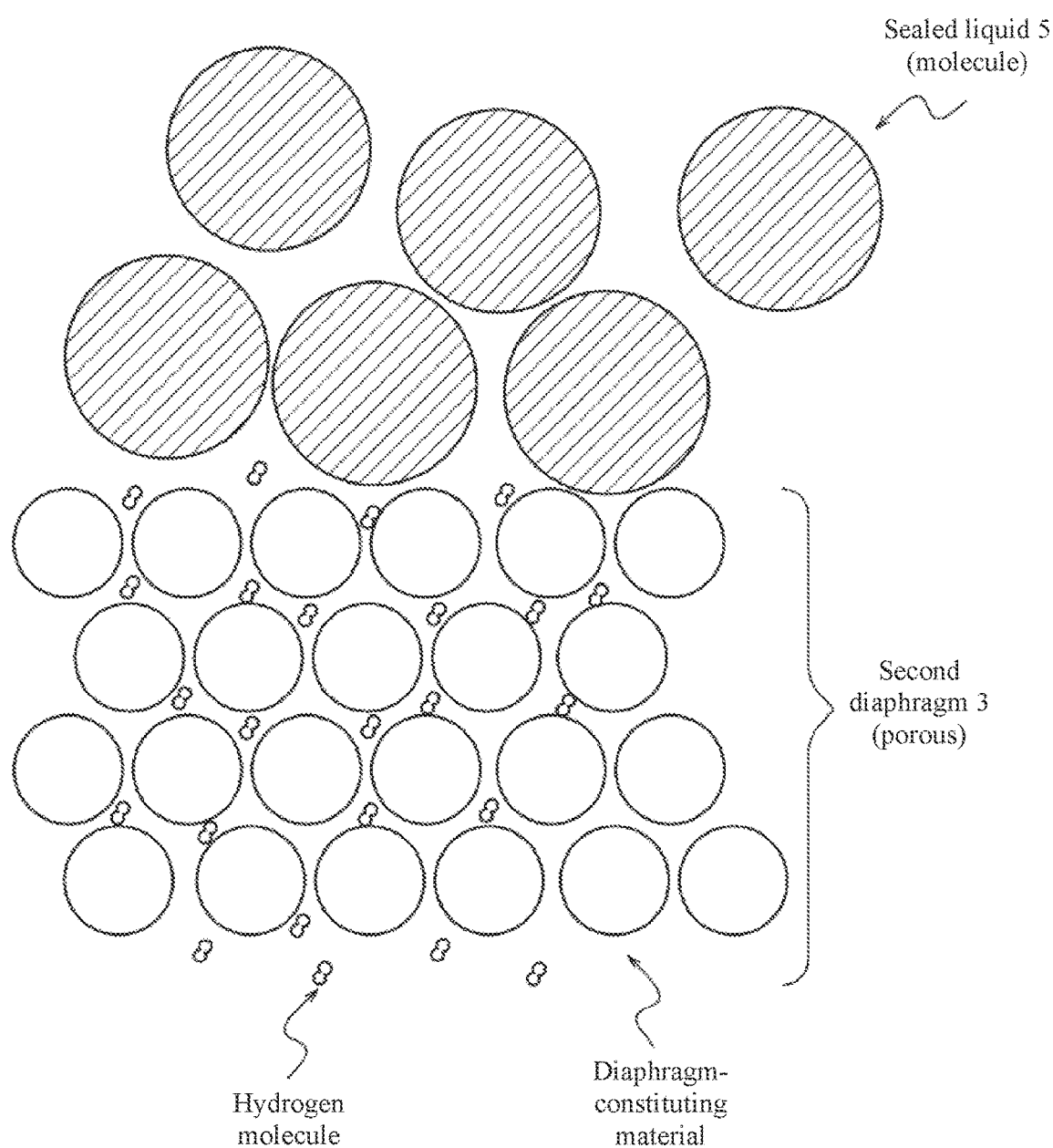
FIG. 7 is a sectional view illustrating a variation having a porous structure of the second diaphragm.
Figure 8:
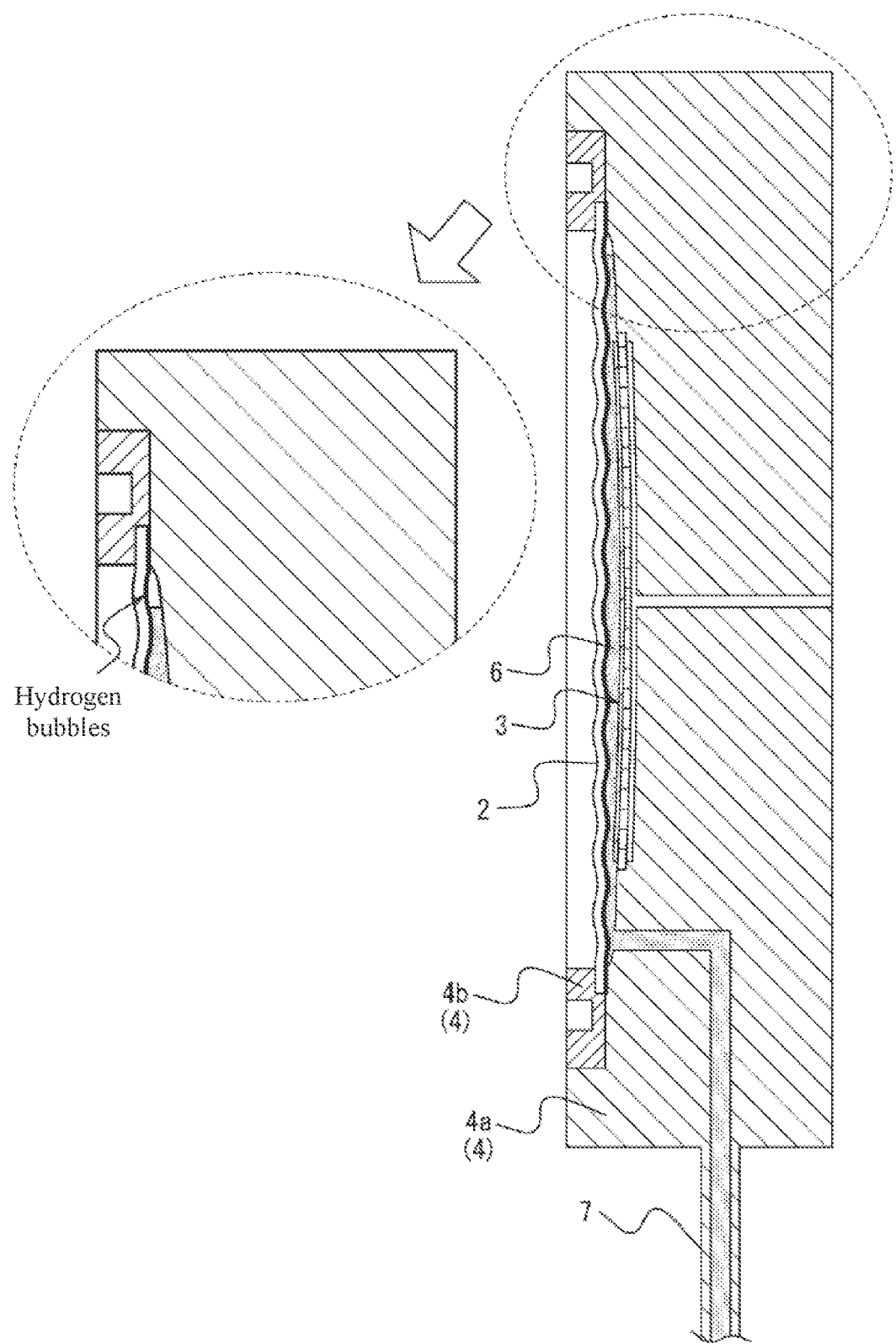
FIG. 8 is a sectional view illustrating hydrogen bubbles accumulated in an outer peripheral portion of a first diaphragm in the diaphragm seal illustrated in FIG. 4.

Hydrogen permeation in a metal is a phenomenon wherein permeation occurs in a state of hydrogen atoms instead of hydrogen molecules (see FIG. 5). As such, hydrogen molecules undergo adsorption and dissociation at a metal surface and dissolve into the metal in the state of hydrogen atoms. The phenomenon of the hydrogen molecules being incorporated into the metal is generally represented by Sieverts's law (see formula (2) below).

[Sieverts's Law]

[Math. 2]

$$C = S \times \sqrt{P} \times \exp\left\{\frac{-E}{2RT}\right\} \quad \text{formula (2)}$$

C: hydrogen dissolution concentration in metal
S: solubility coefficient
P: pressure
E: activation energy
R: gas constant
T: temperature If a catalyst that prompts hydrogen dissociation is present on the metal surface, the activation energy can be decreased, and dissolution into the metal is promoted. If dissolution into the metal is easy, the hydrogen dissolution concentration in the metal increases, and a hydrogen permeation rate inside the metal represented by Fick's law (see formula (1) above) increases.

To promote hydrogen dissolution into the metal, a material wherefrom the following effects can be anticipated may be selected as the hydrogen-adsorbing material 3b:

a) readily dissociates hydrogen molecules (uses a catalyst that decreases an activation energy for dissociation);
  b) has high hydrogen solubility in the metal;
  c) has a large hydrogen diffusion coefficient.

Due to its catalytic effect, a Pd material can dissociate hydrogen molecules at a Pd surface without requiring a high activation energy. Moreover, because it has a large diffusion coefficient, a hydrogen permeation rate is also high. As evidenced by its wide use as a hydrogen-occluding material, it also has a higher hydrogen solubility than other metals. As such, Pd, wherefrom these effects are easily obtained, is adopted as the hydrogen-adsorbing material 3b for incorporating hydrogen.

To increase the hydrogen permeation rate, it is favorable to be able to form the second diaphragm 3 from Pd alone. However, metal materials that meet the above conditions are more likely to experience brittle fracture at a time of use when used alone. As such, a structure is used that combines a Pd film (hydrogen-adsorbing material 3b), which is for accelerating hydrogen dissolution into the metal, and SUS (substrate 3a), which is less likely to undergo hydrogen embrittlement. Because the hydrogen-adsorbing material 3b absorbs hydrogen more readily than the substrate 3a, the hydrogen-adsorbing material 3b provides an effect of speeding up hydrogen incorporation into the metal. Moreover, the substrate 3a can provide a pressure resistance performance.

SUS is a material that is difficult for hydrogen to permeate and is therefore normally not used as a hydrogen-permeable material. Although the hydrogen permeation rate of the second diaphragm 3 may be required to be high, when hydrogen is discharged at a time of use so that hydrogen bubbles do not form inside, it is sufficient for the hydrogen permeation rate to satisfy formula (3) below. As such, there is no concern of hydrogen embrittlement, and what is crucial is to select a material that is reliable and meets the pressure resistance performance.

[Hydrogen Permeation Rate]

$$\text{First diaphragm} < \text{second diaphragm} \qquad \text{formula (3)}$$

In the diaphragm seal 1, a material through which hydrogen permeation is difficult is often used as the first diaphragm 2, which serves as a hydrogen permeation path into the diaphragm seal 1. Moreover, by using a first diaphragm 2 having a gold film applied thereon as a hydrogen barrier layer, normally, even if a SUS material is used for the second diaphragm 3, a hydrogen permeation rate of the first diaphragm 2 can be made lower than the second diaphragm 3.

The first diaphragm 2 is used so as to contact the measurement medium 8. However, depending on the measurement medium 8 and usage conditions such as temperature and pressure, a rate whereat hydrogen is absorbed into the first diaphragm 2 changes, and a hydrogen concentration in the first diaphragm 2 also fluctuates. Depending on temperature conditions of the measurement medium 8, a temperature difference may arise between the first diaphragm 2, which is contacting the measurement medium 8, and the second diaphragm 3, which is inside the diaphragm seal 1.

The relationship of hydrogen permeation rates in formula (3) above does not illustrate a relationship of permeation rates between the first diaphragm 2 and the second diaphragm 3 under the same conditions; this relationship needs to be satisfied even when conditions that the first diaphragm 2 and the second diaphragm 3 are placed in that arise at a time of use are taken into consideration.

In a structure that combines two layers of a Pd film and SUS, near a contact interface between the Pd film and the SUS, hydrogen is present in a state of hydrogen atoms that have diffused through the Pd film. By the hydrogen being in a state of hydrogen atoms, an obstacle is eliminated of hydrogen movement from the Pd film to the SUS requiring a high activation energy. As such, a structure that combines two layers of a Pd film and SUS can realize hydrogen diffusion in the diaphragm more readily compared to a single SUS layer.

Furthermore, because Pd has a greater hydrogen solubility coefficient than SUS, near the contact interface between Pd and SUS, a hydrogen concentration can be made to be high. As such, a difference between $C_1$ (Pd-SUS face-side hydrogen concentration) and $C_2$ (SUS opposing-face side hydrogen concentration) in formula (1) can be increased, and from this, an acceleration of the hydrogen diffusion rate in the SUS can also be anticipated.

The second diaphragm 3 needs to be imparted with a pressure resistance performance and with a performance of hydrogen readily permeating therethrough. For hydrogen to permeate therethrough, a thinner thickness of the second diaphragm 3 is favorable (d in formula (1)). However, to increase the pressure resistance performance, this needs to be made thicker. As such, there is a trade-off relationship. Because the substrate 3a is responsible for the pressure resistance performance, based on a relationship between material strength and hydrogen permeation, a thickness of the substrate 3a may be approximately 20 to 400 μm.

The hydrogen-adsorbing material 3b bears a role of activating the hydrogen and dissolving the hydrogen into the second diaphragm 3, and no pressure resistance performance needs to be ensured for such. As such, the hydrogen permeation rate can be increased by making a film thickness thin and selecting a material having a large hydrogen diffusion coefficient. The thickness of the hydrogen-adsorbing material may be designed to be thinner than the thickness of the substrate 3a. Depending on the usage conditions, a thick-film structure may cause the film to collapse due to hydrogen embrittlement of the material. Therefore, the film thickness may be set within a range of 0.01 to 400 μm.

Effects of First Embodiment

By making a permeation rate of hydrogen permeating and being discharged from the second diaphragm 3 higher than a permeation rate of hydrogen permeating and intruding from the first diaphragm 2, hydrogen can be continuously discharged, even during operation of the measuring instrument (by suppressing hydrogen permeation at the first diaphragm 2 and facilitating hydrogen permeation at the second diaphragm 3, a structure can be provided wherein it is difficult for hydrogen to enter the diaphragm seal 1 but easy for hydrogen in the diaphragm seal 1 to be discharged).

By being able to discharge hydrogen from inside the diaphragm seal 1, no hydrogen bubbles are formed inside, or, even if hydrogen bubbles are formed, the hydrogen can be easily removed by performing maintenance of the diaphragm seal 1. As such, making a life of the measuring instrument independent of hydrogen-bubble formation can be realized.

Variation of First Embodiment, Second to Seventh Embodiments

Next, a variation of the first embodiment and second to seventh embodiments are described.

[Second Diaphragm]

Hydrogen-Adsorbing Material 3b

Although Pd is made to be the material used as the hydrogen-adsorbing material 3b, as long as this material is a substance that functions as a catalyst when hydrogen dissociates at a surface of the material, an effect of accelerating hydrogen dissolution into the material is obtained. This effect is obtained even if Ru, Pd, Os, Ir, Pt, or another platinum-group metal or an alloy thereof; a compound thereof; or the like is used instead of Pd, because a catalytic action is still obtained by using such. Moreover, a catalytic action is still obtained from a compound such as zinc oxide ($ZnO$) or zirconium oxide ($ZrO_2$) outside of the platinum group.

The hydrogen-adsorbing material 3b may not only be formed as a single layer on the substrate 3a but also be configured as a plurality of layers of two or more layers.

In a two-layer configuration, a material having a high hydrogen dissociation performance is used as the first layer, and a material having favorable adhesion with the first layer and the substrate 3a is used as the second layer. This facilitates formation of the hydrogen-adsorbing material 3b without being restricted by adhesion between the materials. In a configuration of three or more layers, the structure may stack a plurality of layers in consideration of a situation where adhesion between the first layer and the substrate 3a is not obtained from the material of the second layer alone, in consideration of mitigating film stress, or in consideration of another factor.

A material that not only has high adhesion but also high hydrogen solubility, high hydrogen permeability may be selected as the material used as the second layer. To illustrate, Ti, Zr, Hf, Rf, V, Nb, Ta, Db, or another metal belonging to group IV or group V or an alloy thereof; a compound thereof; and the like can be mentioned.

The diaphragm seal 1 can be used in a wide range of temperature and pressure conditions. These usage conditions change how the materials used as the hydrogen-adsorbing material 3b affect the effects of a) to c) above. As such, it also becomes possible to select the most favorable material for each layer according to the usage conditions.

By forming the hydrogen-adsorbing material 3b so as to have a large contact area with the substrate 3a, a structure can increase a quantity of hydrogen moved from the hydrogen-adsorbing material 3b to the substrate 3a. As such, the hydrogen-adsorbing material 3b may be formed as a thin film that completely covers the substrate 3a. However, complete coverage is not necessary when usage is possible under conditions whereby the second diaphragm 3 obtains sufficient hydrogen permeability. In this situation, it is favorable to form the hydrogen-adsorbing material 3b as a film of dots, lines, or another shape on a supporting body (see FIG. 6). This enables a usage quantity of expensive precious metals to be decreased and enables inexpensive production. Moreover, a structure can be provided that is effective in film-stress mitigation and the like.

Substrate 3a

Although SUS is used as the material of the substrate 3a, by using, among SUS, SUS316L, which is particularly strong against hydrogen embrittlement, brittle fracture of the second diaphragm 3 can be avoided. As long as usage is under conditions that do not constitute harsh usage wherein a high concentration of hydrogen is dissolved in the substrate 3a, a material having a greater diffusion coefficient than SUS, which has a small hydrogen diffusion coefficient, can be selected as the substrate 3a. When using a material having a large diffusion coefficient, a material must be selected so the usage conditions do not damage the substrate 3a due to hydrogen embrittlement. To illustrate materials of the substrate 3a, in addition to SUS materials, Hastelloy, Monel, Ni, Ti, Mo, and the like can be mentioned. A material having favorable weldability with the material of the block 4 or a material having favorable adhesion with the hydrogen-adsorbing material 3b may be selected.

One or more embodiments use the phenomenon of hydrogen atoms being diffused in and permeating the second diaphragm 3 to discharge hydrogen from inside the diaphragm seal 1. Not only this method of using the diffusion phenomenon but also a method of using a porous substrate 3a having holes in the second diaphragm 3 to use a phenomenon wherein hydrogen molecules pass through the second diaphragm 3 may be used. In this situation, the hydrogen-adsorbing material 3b is not necessarily necessary.

When adopting a porous substrate 3a, setting a size of the holes so hydrogen atoms and molecules, which are small in size, and the sealed liquid 5, which has a large molecular size, can be separated enables hydrogen to be selectively and quickly discharged. For example, supposing a hydrogen-atom size to be approximately 0.1 nm and the molecular size of the sealed liquid 5 to be approximately several 100 nm, setting the hole size to be approximately several 10 nm enables a structure wherein the sealed liquid 5 cannot pass through the substrate 3a but hydrogen can pass through the substrate 3a (see FIG. 7). Because a type of the sealed liquid 5 that is used differs according to usage, the hole size may be set to an optimal hole size according to the molecular size and a degree of polymerization of the sealed liquid 5. Moreover, when a porous substrate is used as the second diaphragm 3, a structure may be adopted wherein the porous substrate is adhered to the block 4 side so the second diaphragm 3 is not movable.

When a single layer of the porous substrate is used (when the hydrogen-adsorbing material 3b is not used), there is a concern that components of the sealed liquid 5 will also pass through due to the hole size being readily affected by temperature, pressure, and the like; a sealed liquid 5 having a low degree of polymerization being used; a sealed liquid 5 including many monomers being used; and the like. In view of the above, a structure providing a two-layer configuration, of the hydrogen-adsorbing material 3b and the porous substrate, for the second diaphragm 3 may be adopted. A structure that discharges hydrogen from inside the diaphragm seal 1 is adopted by a method wherein a hydrogen ion/atom diffusion phenomenon is used in a hydrogen-adsorbing-material 3b portion and hydrogen molecules pass through the holes in a porous-substrate portion. Such a structure may be advantageous in the single layer of the porous substrate. The hydrogen-adsorbing material 3b, which has high hydrogen permeability, comes to determine a rate whereat hydrogen is discharged from inside the diaphragm seal 1. Moreover, a structure can be adopted that prevents a situation where the hydrogen-adsorbing material 3b readily undergoes hydrogen embrittlement, even if the hydrogen-adsorbing material 3b undergoes hydrogen embrittlement and develops a crack or the like.

To illustrate a production method of the porous substrate, sintering of a metal powder or the like, fusion of metal balls or the like (by heat, load application, or the like), plating, and other methods or the like can be mentioned. This can also be formed by a structure that also uses a glass or ceramic material or by a method that, for example, performs fusion upon mixing with a metal powder.

The structure of the second diaphragm 3 may be formed by a ceramic material instead of a metal material. In this situation, a structure that is fixed to the block 4 may be adopted so that the substrate 3a is not damaged due to deforming upon receiving pressure. The fixing can be performed by a method such as brazing, adhesion using glass, or the like.

As the ceramic material, it is desirable to use, for example, a conductive ceramic that is easily permeated by protons. When using a ceramic material that is easily permeated by protons as the substrate 3a, the hydrogen-adsorbing material 3b is not necessarily necessary, and a hydrogen discharging effect is obtained even by a single layer of the ceramic material.

Shape of Second Diaphragm 3

For usage conditions wherein, for example, releasing hydrogen near where the diaphragm seal 1 is disposed is discouraged, usage may be such that hydrogen is discharged at a time of maintenance or the like and hydrogen is enclosed in the diaphragm seal 1 at a time of operation. In this situation, hydrogen bubbles are anticipated to form in the diaphragm seal 1.

As illustrated in FIG. 4, in the first embodiment, the sealed-liquid housing portion 6 has a structure of being communicated to the capillary 7 by extending to an outer peripheral side of the second diaphragm 3. As such, when hydrogen bubbles form near an outer peripheral portion of the first diaphragm 2, the hydrogen bubbles do not contact the second diaphragm 3. This has a possibility of decreasing an efficiency of discharging hydrogen to the outside. When the diaphragm seal 1 is disposed in a standing posture and hydrogen bubbles are formed, the hydrogen bubbles are more likely to accumulate in the position indicated in FIG. 8.

Figure 9:
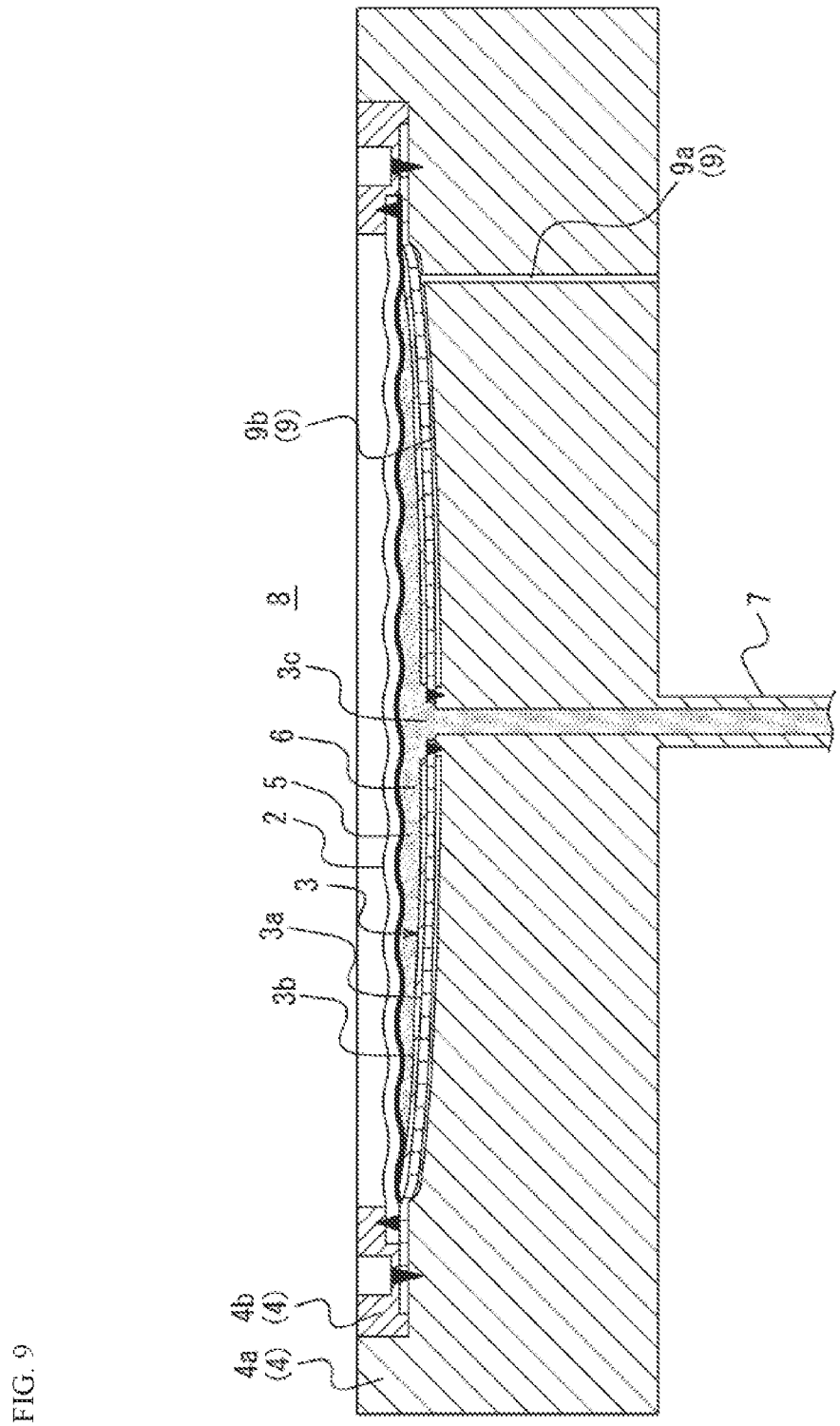
FIG. 9 is a sectional view illustrating the diaphragm seal of a second embodiment.

So the hydrogen formed near the outer peripheral portion of the first diaphragm 2 is more easily discharged, the second diaphragm 3 may be made into a doughnut shape as in the second embodiment illustrated in FIG. 9. By making this into a doughnut shape, the capillary 7, which is connected to the transmitter, can be connected to a central portion of the block 4. As such, a structure is enabled that forms the second diaphragm 3 all the way to the outer peripheral portion wherein the hydrogen easily accumulates. In this manner, a structure can be provided wherein the second diaphragm 3 has an opening 3c in the center and the sealed-liquid housing portion 6 is communicated to the capillary 7 through the opening 3c.

Furthermore, by making the second diaphragm 3 have a doughnut shape, an effect is also obtained of improving the pressure resistance performance of the second diaphragm 3. When using the measuring instrument as a vacuum gauge, the second diaphragm 3 bends convexly to a first-diaphragm 2 side due to the pressure received from the measurement medium 8. This is because at this time, the structure of FIG. 9 can better suppress a change in volume due to deformation of the second diaphragm 3 and further reduce stress applied to the second diaphragm 3 as compared to the structure of FIG. 4.

[Hydrogen Discharge Path 9]

Hydrogen Discharge Groove 9b

The second diaphragm 3 may have a backed-up structure so that the pressure received from the sealed liquid 5 is transferred to the block 4 side. Even if pressure is applied to the second diaphragm 3 and it is being used in a backed-up state, hydrogen can be discharged if there is a channel that guides the hydrogen that passed through the second diaphragm 3 to outside the diaphragm seal 1. The channel for hydrogen discharging is formed by a groove provided on the block side (hydrogen discharge groove 9b). However, so plastic deformation is not repeated in a location where the second diaphragm 3 contacts the groove even when pressure is applied to the second diaphragm 3, a depth of the groove and a width of the groove need to be designed according to a usage pressure of the measuring instrument. When the pressure is high, the depth of the groove and the width of the groove may be designed to each be small and to increase a number of grooves.

When the measuring instrument is used as a vacuum gauge, the second diaphragm 3 may bend convexly to the sealed-liquid 5 side instead of the block 4 side. In this situation, a usage method of the second diaphragm 3 is not one of being backed up by the block 4. As such, damage to the second diaphragm 3 can be prevented by partially fixing the second diaphragm 3 and the block 4. The second diaphragm 3 can be fixed by spot-welding a plurality of locations so the hydrogen discharge groove 9b is not completely filled.

Sealing Structure

Depending on how the measuring instrument is to be used, releasing hydrogen in a location wherein the diaphragm seal 1 is disposed may want to be avoided. For such a usage, the diaphragm seal 1 of the third embodiment illustrated in FIG. 10 can be used. In the third embodiment, the diaphragm seal 1 is used in a state wherein the hydrogen discharge hole 9a, a sealing plug 14 as an external component 13 is screwed into and installed in the external component connection portion 11. Because hydrogen is not discharged from inside the diaphragm seal 1, hydrogen accumulates in the diaphragm seal 1; the structure is for use without releasing hydrogen to the outside until near a usage limit of the measuring instrument.

Figure 11:
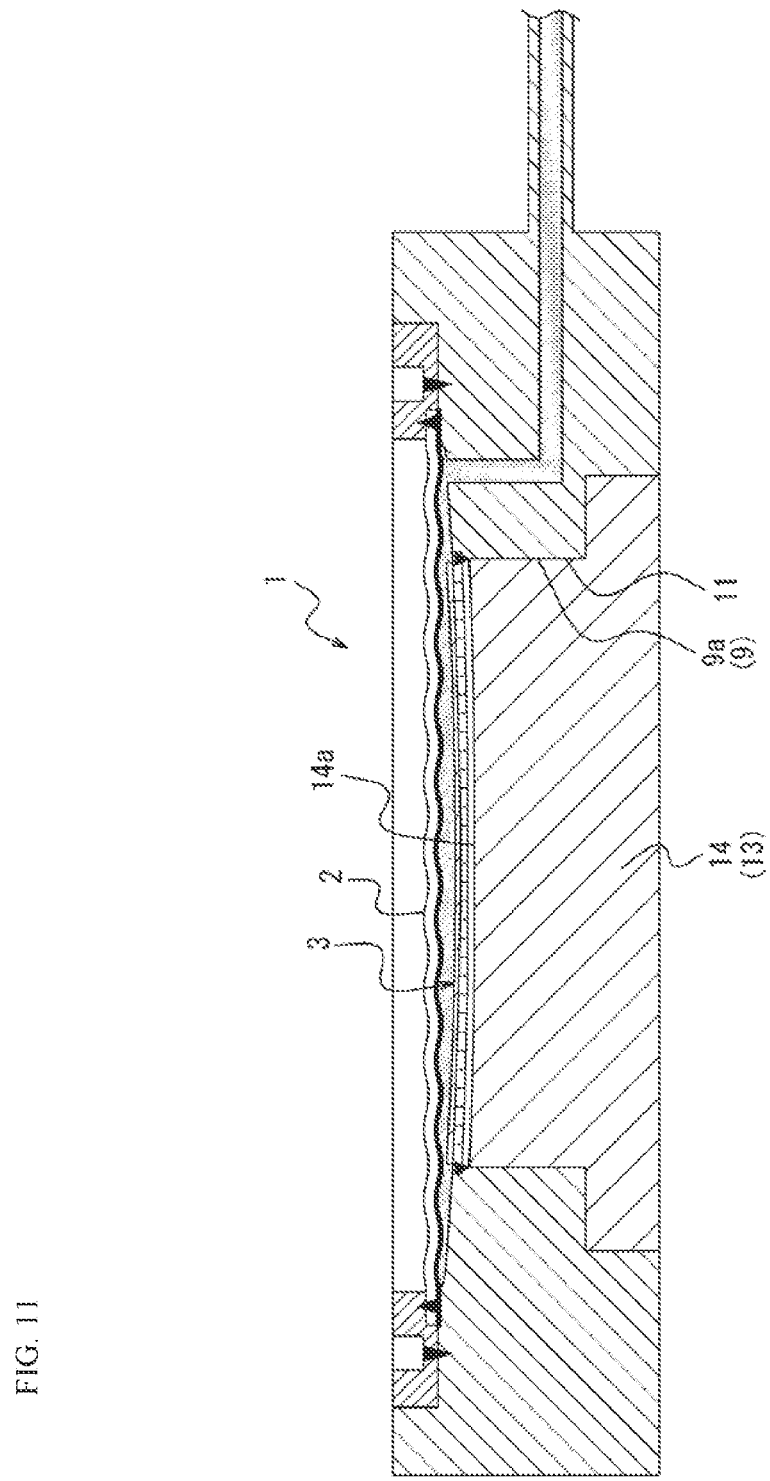
FIG. 11 is a sectional view illustrating the diaphragm seal of a fourth embodiment.

The structure whereby the hydrogen discharge path 9 is sealed may be the structure of the fourth embodiment illustrated in FIG. 11. In the structure of the fourth embodiment, the hydrogen discharge hole 9a has a size equivalent to the second diaphragm 3, and a structure is adopted wherein in the external component connection portion 11 provided in the hydrogen discharge hole 9a, a sealing plug 14 of a size corresponding thereto is screwed in and installed. A distal-end face 14a of the sealing plug 14 has a size equivalent to the second diaphragm 3 and opposes the second diaphragm 3 in a state wherein the sealing plug 14 is connected to the external component connection portion 11. An interval is set between the second diaphragm 3 and the distal-end face 14a of the sealing plug 14 so the distal-end face 14a of the sealing plug 14 also has a function of being able to back up the second diaphragm 3 when pressure is applied to the second diaphragm 3. By adopting the structure of the fourth embodiment, removing the sealing plug 14 makes it possible to expose the second diaphragm 3 at a time of an operation of eliminating hydrogen from inside the diaphragm seal 1.

The sealing structure can be formed by installing a sealing plug 14 having a screw shape or the like. However, a structure can also be used that installs an instrument such as a sensor to be used instead of the sealing plug 14.

An atmosphere inside the sealed cavity (hydrogen discharge path 9) may be a vacuum. Even when use is as a vacuum gauge, the second diaphragm 3 bending greatly in a convex direction to the sealed-liquid 5 side can be avoided, and an effect is also obtained whereby hydrogen is more easily released from the second diaphragm 3 into the hydrogen discharge path 9.

When such a sealing structure is formed, the hydrogen accumulated in the diaphragm seal 1 can be regenerated by releasing the hydrogen in a location other than a location where the measuring instrument is disposed when performing maintenance of the measuring instrument.

When adopting the sealing structure, it is not necessarily necessary for formula (3) above to be satisfied. If formula (3) does not need to be satisfied, a structure can also be adopted wherein the second diaphragm 3 is only the substrate 3a and the hydrogen-adsorbing material 3b is not provided.

Furthermore, even in a usage wherein a design is required that anticipates a situation where the second diaphragm 3 becomes damaged, imparting the sealing portion with a sufficient pressure resistance performance enables a structure that takes safety measures.

[Installation of External Component 13 to Diaphragm Seal 1]

Installation of Piping

Figure 10:
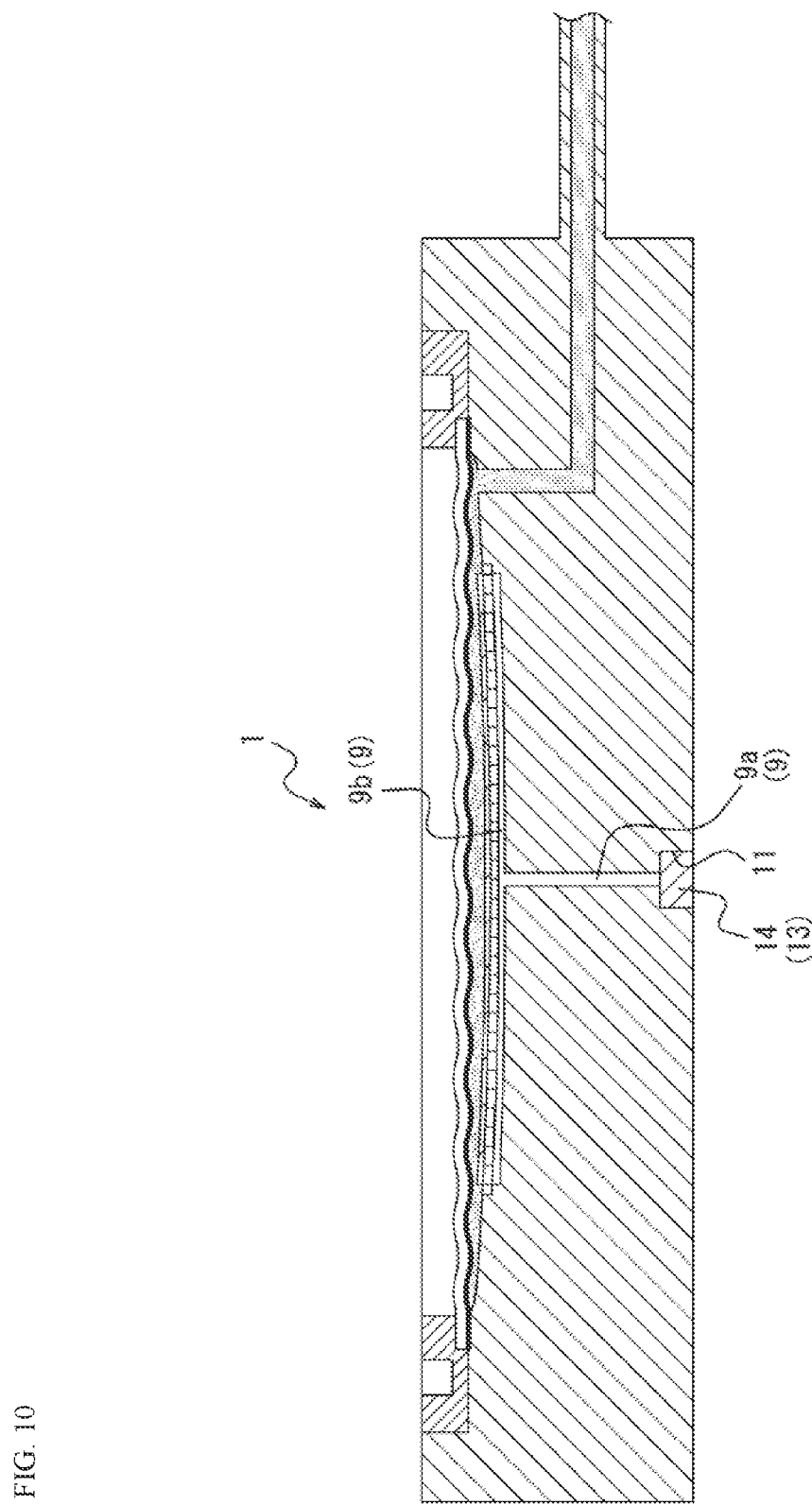
FIG. 10 is a sectional view illustrating the diaphragm seal of a third embodiment.

In the structure of FIG. 10, hydrogen that has permeated the second diaphragm 3 is accumulated in the hydrogen discharge path 9. A state wherein, as in the fifth embodiment illustrated in FIG. 12, piping 15 or the like is installed as the external component 13 and the piping 15 is also sealed extends the hydrogen discharge path 9 wherein the hydrogen accumulates to the piping 15 and enables more hydrogen to accumulate than plugging the hydrogen discharge hole 9a. As such, a maintenance period for hydrogen discharging can be lengthened.

In sealing the installed piping 15, it is also possible to install a sensor 16 at an end portion of the piping 15 to enable inspection of a state of the diaphragm seal 1. In a situation where sealing is performed, the seal can be opened at a time of maintenance or the like, and this can also be used for inspection and hydrogen discharging. Even in a usage wherein a design is required that anticipates a situation where the second diaphragm 3 becomes damaged, imparting a sufficient pressure resistance performance—this imparting including the piping 15 as well-enables a structure that takes safety measures.

A situation is also anticipated wherein the piping 15 is connected to the hydrogen discharge hole 9a of the diaphragm seal 1 but not used as a sealing structure. In this situation, there is also a usage method of disposing the end portion (release port) of the piping 15 away from the diaphragm seal 1. Being able to dispose the release port of the piping 15 in a position away from the diaphragm seal 1 is effective for a situation where hydrogen leakage near the diaphragm seal 1 is discouraged.

Installation of Sensor

Figure 12:
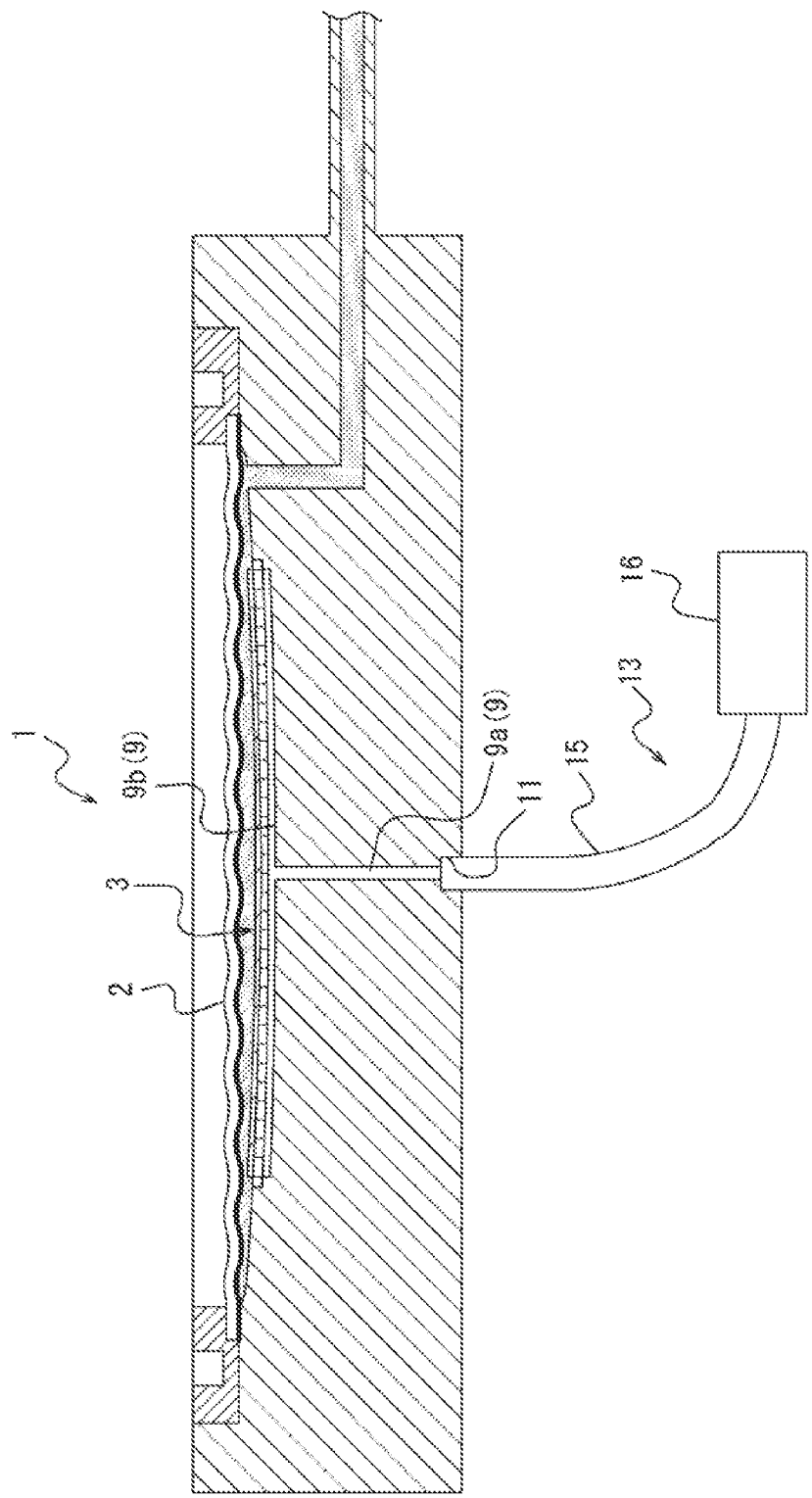
FIG. 12 is a sectional view illustrating the diaphragm seal of a fifth embodiment.
Figure 13:
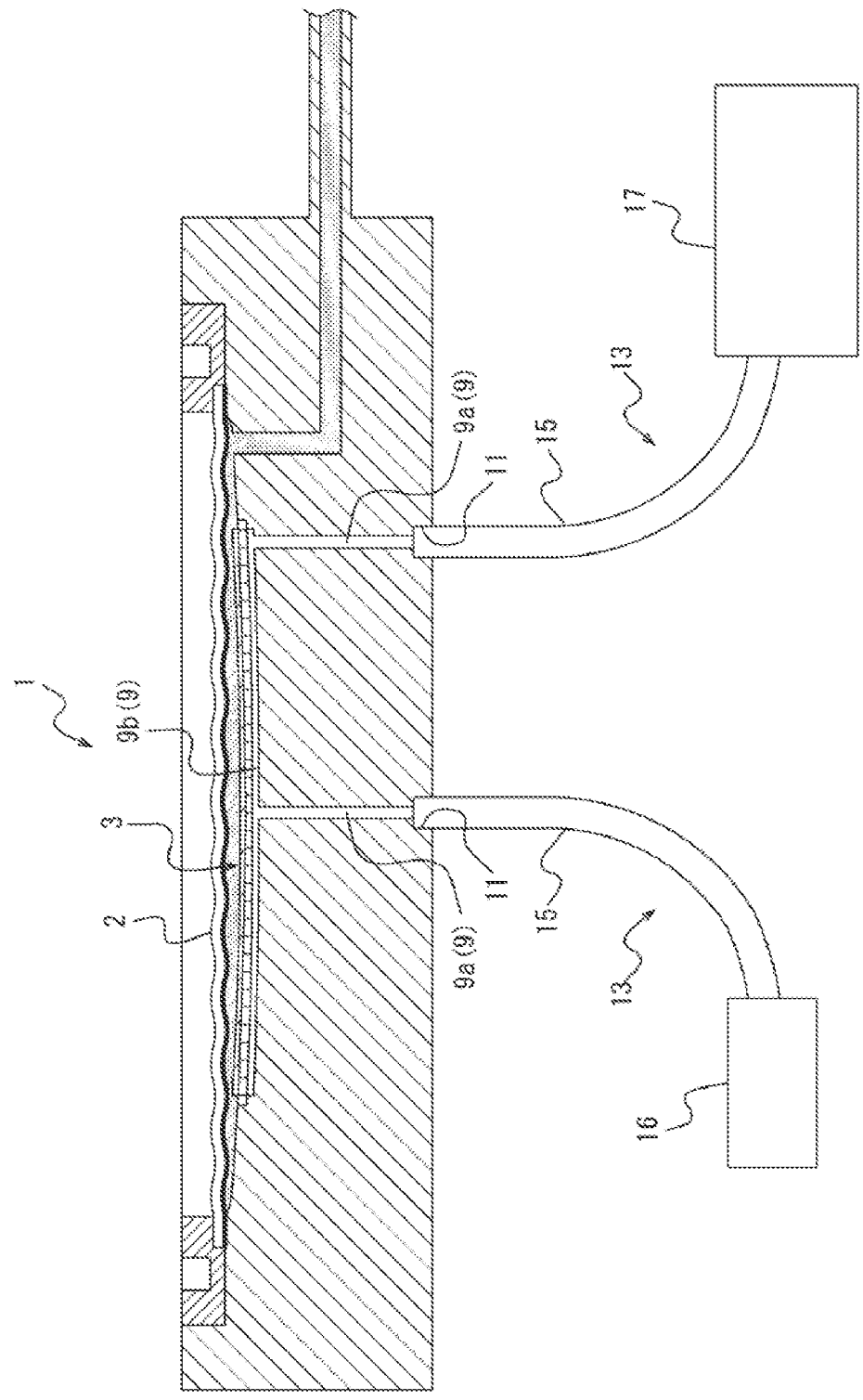
FIG. 13 is a sectional view illustrating the diaphragm seal of a sixth embodiment.

Constituting the external component 13 in FIG. 12 by the sensor 16 enables state and process information and the like of the diaphragm seal 1 to be acquired from the sensor 16.

As the sensor 16, a pressure sensor, a temperature sensor, a hydrogen sensor, and the like can be illustrated. However, when a pressure sensor is installed, a state of the hydrogen permeated into the diaphragm seal 1 can be monitored from the outside by measuring a vacuum level in the hydrogen discharge path 9. Likewise, a status of the hydrogen inside can also be monitored by installing a hydrogen sensor. When a temperature sensor is installed, a temperature of the diaphragm seal 1 can be measured, and, for example, data useful for temperature monitoring of a process fluid, predicting hydrogen permeation into the diaphragm seal 1, and the like can also be acquired.

Although the sensor 16 may be externally attached directly to the hydrogen discharge hole 9a of the diaphragm seal 1, because the sensor 16 may be unusable when the temperature of the diaphragm seal 1 is high, as in FIG. 12, the sensor 16 may be installed at the end portion of the piping 15 so that the piping 15 can be used to perform measurement in a location having a low temperature.

Installation of Hydrogen Occlusion Cartridge

When a structure is adopted that has a hydrogen-occluding material in the diaphragm seal 1, in conditions of a high usage temperature, a hydrogen occlusion capacity of the occluding material decreases significantly such that no hydrogen occlusion effect is obtained. However, adopting a structure that, as in the sixth embodiment illustrated in FIG. 13, installs a hydrogen occlusion cartridge 17 having a hydrogen-occluding material as the external component 13 in the diaphragm seal 1 enables heat to be released to the outside before it is conducted to the hydrogen-occluding material such that the hydrogen-occluding material is not exposed to high temperatures. As such, use is enabled in a situation where the capacity of the hydrogen-occluding material is obtained.

Even when use is under process conditions of a high temperature, the second diaphragm 3 sees an accelerated hydrogen discharging capacity because of an increased diffusion rate due to the high temperature. The hydrogen occlusion cartridge 17, which is installed in a location having a lower temperature than the diaphragm seal 1, can be made to be able to perform sufficient hydrogen occlusion. As such, usage is possible under favorable conditions in terms of hydrogen discharging from inside the diaphragm seal 1. Although the hydrogen occlusion cartridge 17 may be externally attached directly to the hydrogen discharge hole 9a of the diaphragm seal 1, as in FIG. 13, the hydrogen occlusion cartridge 17 may be installed at the end portion of the piping 15 so that the piping 15 can be used to perform hydrogen occlusion in a location having a low temperature.

When a hydrogen occlusion quantity in the hydrogen-occluding material reaches a tolerance, the measuring instrument can continue to operate by simply exchanging the hydrogen occlusion cartridge 17 (or the piping 15 and the hydrogen occlusion cartridge 17), without removing the diaphragm seal 1.

If the hydrogen occlusion cartridge 17 is made to be a pressure-resistant container, even in a usage wherein a design is required that anticipates a situation where the second diaphragm 3 becomes damaged, imparting a sufficient pressure resistance performance—this imparting including the hydrogen occlusion cartridge 17 and the like as well-enables a structure that takes safety measures.

Furthermore, adopting a structure that, as in the sixth embodiment, externally attaches the hydrogen occlusion cartridge 17 and the sensor 16 also enables monitoring of a state of the hydrogen permeated into the diaphragm seal 1 and an occlusion status of the hydrogen occlusion cartridge 17. Whether the hydrogen occlusion cartridge 17 needs to be exchanged can also be confirmed by information obtained from the sensor 16. Note that in the sixth embodiment, two hydrogen discharge holes 9a are provided in the hydrogen discharge path 9, an external component connection portion 11 is provided to each hydrogen discharge hole 9a, and an external component 13 is connected to each external component connection portion 11. One external component 13 is constituted by piping 15 and the hydrogen occlusion cartridge 17, and the other external component 13 is constituted by piping 15 and the sensor 16.

[Maintenance Method (Hydrogen Discharging Operation)]

For a usage wherein releasing hydrogen near the diaphragm seal 1 is discouraged when the measuring instrument is operating, there is a method of sealing the hydrogen discharge path 9 and the like of the diaphragm seal 1 to prohibit releasing. In this situation, hydrogen accumulates in the diaphragm seal 1 as in a conventional diaphragm seal 1.

When hydrogen has accumulated in the diaphragm seal 1, the accumulated hydrogen can be discharged by removing the measuring instrument and performing a hydrogen discharging operation at a time of periodic maintenance or the like. The hydrogen discharging uses a method of removing the external component 13, such as the sealing plug 14, and releasing the hydrogen to the outside.

By raising a temperature of the diaphragm seal 1, a time it takes to discharge hydrogen from inside the diaphragm seal 1 can be shortened. By raising the temperature, the rate whereat the hydrogen in the sealed liquid 5 is incorporated into the second diaphragm 3 increases, and the hydrogen diffusion coefficient in the second diaphragm 3 can be increased. This is because this can provide a state wherein hydrogen is easily discharged from inside the diaphragm seal 1.

Because hydrogen is diffused according to a concentration difference, increasing the hydrogen concentration difference can increase a discharge rate. Hydrogen that has permeated the second diaphragm 3 moves toward the hydrogen discharge hole 9a while being diffused in the hydrogen discharge path 9 and is discharged to outside the diaphragm seal 1. At this time, the hydrogen permeated from the second diaphragm 3 comes to be present between the second diaphragm 3 and the block 4. However, by forcibly eliminating the permeated hydrogen from inside the diaphragm seal 1, a hydrogen discharge rate from the second diaphragm 3 can be increased.

As a method of doing so, as in the seventh embodiment illustrated in FIG. 14, air or another fluid is introduced by pressurization or suction from one or more hydrogen discharge holes 9a among two or more that are formed. By this, the hydrogen accumulated in the diaphragm seal 1 is discharged to outside the diaphragm seal 1 from the other hydrogen discharge holes 9a, and this can increase a hydrogen releasing rate. This method may be performed not only at a time of maintenance but also when the measuring instrument is operating. As illustrated in FIG. 14, in the seventh embodiment, the hydrogen discharge path 9 has a first opening (one hydrogen discharge hole 9a) and a second opening (another hydrogen discharge hole 9a) that open to outside the diaphragm seal 1. To discharge the hydrogen accumulated in the diaphragm seal 1 to outside the diaphragm seal 1, a method is adopted of introducing the fluid through one among the first opening and the second opening and discharging the hydrogen together with the fluid through the other among the first opening and the second opening.

In the structure of the fourth embodiment illustrated in FIG. 11, the second diaphragm 3 can be exposed by removing the sealing plug 14. As such, even without performing an operation such as flowing a fluid into the diaphragm seal 1, the hydrogen that has permeated the second diaphragm 3 can be efficiently scattered outside the diaphragm seal 1. If a hydrogen concentration near the second diaphragm 3 can be decreased, the hydrogen permeation rate in the second diaphragm 3 can be increased, and a hydrogen discharging efficiency in the diaphragm seal 1 can be improved.

The above embodiments are one example of the present disclosure, and needless to say, many variations are possible.

For example, many variations, such as those below, are possible for the diaphragm seal 1 of the above embodiments.

Many variations of the diaphragm seal 1 of the above embodiments are possible as long as they have the first diaphragm 2 that faces the measurement medium 8, the sealed-liquid housing portion 6 that houses the sealed liquid 5 for transferring the pressure that the first diaphragm 2 receives from the measurement medium 8 to the transmitter, and the second diaphragm 3 through which hydrogen is permeated in order to discharge hydrogen intruded into the sealed liquid 5 from the sealed liquid 5.

However, the diaphragm seal 1 may have the hydrogen discharge path 9 for discharging the hydrogen permeated through the second diaphragm 3 to outside the diaphragm seal 1. Moreover, the hydrogen discharge path 9 may have the external component connection portion 11 that can connect the external component 13. The external component 13 may have the hydrogen occlusion cartridge 17. The diaphragm seal 1 may have a pressure-resistant structure in a state wherein the external component 13 is connected to the external component connection portion 11. The external component connection portion 11 may be sealed by the external component 13 with the hydrogen discharge path 9 in a negative-pressure state. The second diaphragm 3 may have the substrate 3a and a material that is disposed on a surface on the sealed-liquid 5 side of the substrate 3a and functions as a catalyst that prompts hydrogen dissociation in order to accelerate hydrogen intrusion into the second diaphragm 3. The second diaphragm 3 may have the substrate 3a and a material that is disposed on the surface on the sealed-liquid 5 side of the substrate 3a and more readily absorbs hydrogen than the substrate 3a in order to accelerate hydrogen intrusion into the second diaphragm 3. This material may include a platinum-group metal or an alloy thereof, or a compound thereof. This material may have a thin-film structure thinner than the thickness of the substrate 3a. The substrate 3a may be formed of SUS316L. This material may be configured as a plurality of layers. The substrate 3a may be formed of a conductive ceramic material wherethrough hydrogen permeates. The substrate 3a may have a porous structure provided with holes that allow hydrogen to permeate but do not allow the sealed liquid 5 to permeate. The hydrogen permeation rate of the second diaphragm 3 may be greater than the hydrogen permeation rate of the first diaphragm 2. The diaphragm seal may include the supporting face 12 that contacts the surface on the opposite side of the sealed liquid 5 of the second diaphragm 3 by the second diaphragm 3 being deformed to the opposite side of the sealed liquid 5 due to the pressure of the measurement medium 8 and thereby supports the second diaphragm 3. The supporting face 12 may have the hydrogen discharge groove 9b that constitutes the hydrogen discharge path 9. The hydrogen discharge path 9 may have the hydrogen discharge groove 9b and the hydrogen discharge hole 9a that is communicated to the hydrogen discharge groove 9b. The hydrogen discharge hole 9a may have the external component connection portion 11. The second diaphragm 3 may have the opening 3c, and the sealed-liquid housing portion 6 may be communicated to the capillary 7 through the opening 3c. The diaphragm seal may include the sensor 16, which acquires physical information regarding the interior of the diaphragm seal 1. Alternatively, the external component 13 may be the sensor 16 that acquires the physical information regarding the interior of the diaphragm seal 1.

Many variations of the method of maintaining the diaphragm seal 1 of the above embodiments are possible as long as the diaphragm seal 1 has the first diaphragm 2 that faces the measurement medium 8, the sealed-liquid housing portion 6 that houses the sealed liquid 5 for transferring the pressure that the first diaphragm 2 receives from the measurement medium 8 to the transmitter, and the second diaphragm 3 through which hydrogen is permeated in order to discharge hydrogen intruded into the sealed liquid 5 from the sealed liquid 5 and as long as the methods have a discharging step of discharging the hydrogen permeated through the second diaphragm 3 to outside the diaphragm seal 1.

However, the method may include a determination step of using the sensor 16 installed to the diaphragm seal 1 to acquire physical information regarding the hydrogen occlusion quantity of the hydrogen occlusion cartridge 17 installed to the diaphragm seal 1 to occlude the hydrogen permeated through the second diaphragm 3 and of determining whether to exchange the hydrogen occlusion cartridge 17. Moreover, the discharging step may have a heating step of heating the diaphragm seal 1, thereby increasing the hydrogen permeation rate of the second diaphragm 3, and thus accelerating hydrogen discharge to outside the diaphragm seal 1. The diaphragm seal 1 may have the hydrogen discharge path 9 for discharging the hydrogen permeated through the second diaphragm 3 to outside the diaphragm seal 1, the hydrogen discharge path 9 may have the first opening and the second opening that open to outside the diaphragm seal 1, and the discharging step may have a fluid introduction step of introducing a fluid through one among the first opening and the second opening and discharging the hydrogen together with the fluid through the other among the first opening and the second opening.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

1 diaphragm seal
2 first diaphragm
3 second diaphragm
3a substrate
3b hydrogen-adsorbing material
3c opening
4 block
4a block main body
4b seal ring
5 sealed liquid
6 sealed-liquid housing portion
7 capillary
8 measurement medium
9 hydrogen discharge path
9a hydrogen discharge hole
9b hydrogen discharge groove
10 coating film
11 external component connection portion
12 supporting face
13 external component
14 sealing plug
14a distal-end face
15 piping
16 sensor
17 hydrogen occlusion cartridge
100 diaphragm seal
101 coating film
102 diaphragm
103 measurement medium
104 capillary
105 sealed liquid
106 block
106a block main body
106b seal ring
107 sealed-liquid housing portion
200 diaphragm seal
201 measurement medium
202 diaphragm
203 sealed liquid
300 diaphragm seal
301 capillary
302 hydrogen-permeable material
303 sealed liquid
304 occlusion chamber
305 hydrogen-occluding material
306 openable lid

What is claimed is:

1. A diaphragm seal comprising:
a first diaphragm disposed that faces a measurement medium and receives pressure from the measurement medium;
a sealed-liquid housing that houses a sealed liquid for transferring the pressure to a transmitter; and
a second diaphragm that causes hydrogen intruded into the sealed liquid to permeate through the second diaphragm and be discharged from the sealed liquid.

2. The diaphragm seal according to claim 1, further comprising:
a hydrogen discharge path that discharges the hydrogen permeated through the second diaphragm to outside the diaphragm seal.

3. The diaphragm seal according to claim 2, wherein the hydrogen discharge path comprises a connector that connects an external component.

4. The diaphragm seal according to claim 3, wherein the external component comprises a hydrogen occlusion cartridge.

5. The diaphragm seal according to claim 1, wherein the second diaphragm comprises:
a substrate; and
a material disposed on a surface on a sealed-liquid side of the substrate, and
the material functions as a catalyst that prompts hydrogen dissociation and causes intrusion of the hydrogen into the second diaphragm to be accelerated.

6. The diaphragm seal according to claim 1, wherein a hydrogen permeation rate of the second diaphragm is greater than a hydrogen permeation rate of the first diaphragm.

7. The diaphragm seal according to claim 1, further comprising:
a supporting face that contacts a surface on an opposite side of the sealed liquid of the second diaphragm and supports the second diaphragm when the pressure of the measurement medium deforms the second diaphragm to the opposite side of the sealed liquid.

8. A method of maintaining a diaphragm seal that comprises a first diaphragm, a sealed-liquid housing that houses a sealed liquid, and a second diaphragm that, the method comprising:
causing hydrogen intruded into the sealed liquid to permeate through the second diaphragm; and
discharging the permeated hydrogen to outside the diaphragm seal, wherein
the first diaphragm that faces a measurement medium,
the first diaphragm receives pressure from the measurement medium, and
the sealed liquid transfers the pressure to a transmitter.

9. The method according to claim 8, further comprising:
acquiring, with a sensor installed to the diaphragm seal, physical information relating to a hydrogen occlusion quantity of a hydrogen occlusion cartridge installed to the diaphragm seal; and
determining, with the sensor, whether to exchange the hydrogen occlusion cartridge, wherein
the hydrogen occlusion cartridge occludes the hydrogen permeated through the second diaphragm.

10. The method according to claim 8, wherein the discharging further comprises:
heating the diaphragm seal to increase a hydrogen permeation rate of the second diaphragm, and
accelerating discharging of the hydrogen to outside the diaphragm seal.

* * * * *